US008741258B2

(12) United States Patent
Huber et al.

(10) Patent No.: US 8,741,258 B2
(45) Date of Patent: Jun. 3, 2014

(54) PRODUCTION OF HYDROGEN, LIQUID FUELS, AND CHEMICALS FROM CATALYTIC PROCESSING OF BIO-OILS

(75) Inventors: George W. Huber, Belchertown, MA (US); Tushar P. Vispute, Tonawanda, NY (US); Kamalakanta Routray, Paducah, KY (US)

(73) Assignee: University of Massachusetts, Boston, MA (US)

( * ) Notice: Subject to any disclaimer, the term of this patent is extended or adjusted under 35 U.S.C. 154(b) by 475 days.

(21) Appl. No.: 13/119,750

(22) PCT Filed: Sep. 18, 2009

(86) PCT No.: PCT/US2009/057459
§ 371 (c)(1),
(2), (4) Date: Jun. 21, 2011

(87) PCT Pub. No.: WO2010/033789
PCT Pub. Date: Mar. 25, 2010

(65) Prior Publication Data
US 2011/0245554 A1 Oct. 6, 2011

Related U.S. Application Data

(60) Provisional application No. 61/098,091, filed on Sep. 18, 2008.

(51) Int. Cl.
*C07C 4/00* (2006.01)

(52) U.S. Cl.
USPC ........... 423/644; 585/240; 585/469; 585/638; 585/639; 585/640; 585/733; 585/752; 44/307; 44/308; 44/605; 44/606

(58) Field of Classification Search
USPC ......... 585/240–242, 469, 638–640, 733, 752; 44/307–308, 605–606; 423/644
See application file for complete search history.

(56) References Cited

U.S. PATENT DOCUMENTS

| | | | |
|---|---|---|---|
| 4,503,274 | A | 3/1985 | Arena |
| 4,795,841 | A | 1/1989 | Elliott et al. |
| 5,651,953 | A | 7/1997 | Yokoyama et al. |
| 6,699,457 | B2 | 3/2004 | Cortright et al. |
| 6,824,576 | B2 | 11/2004 | Lightner |
| 6,953,873 | B2 | 10/2005 | Cortright et al. |
| 6,964,758 | B2 | 11/2005 | Cortright et al. |

(Continued)

FOREIGN PATENT DOCUMENTS

| | | | |
|---|---|---|---|
| WO | 2007002719 | A2 | 1/2007 |
| WO | 2007075476 | A2 | 7/2007 |
| WO | 2008006904 | A1 | 1/2008 |
| WO | 2008069830 | A2 | 6/2008 |

OTHER PUBLICATIONS

Cortright et al., "Hydrogen from Catalytic Reforming of Biomass-derived Hydrocarbons in Liquid Water", Nature 2002, p. 418.

(Continued)

*Primary Examiner* — Brian McCaig
(74) *Attorney, Agent, or Firm* — Cantor Colburn LLP

(57) ABSTRACT

Disclosed herein is a method of generating hydrogen from a bio-oil, comprising hydrogenating a water-soluble fraction of the bio-oil with hydrogen in the presence of a hydrogenation catalyst, and reforming the water-soluble fraction by aqueous-phase reforming in the presence of a reforming catalyst, wherein hydrogen is generated by the reforming, and the amount of hydrogen generated is greater than that consumed by the hydrogenating. The method can further comprise hydrocracking or hydrotreating a lignin fraction of the bio-oil with hydrogen in the presence of a hydrocracking catalyst wherein the lignin fraction of bio-oil is obtained as a water-insoluble fraction from aqueous extraction of bio-oil. The hydrogen used in the hydrogenating and in the hydrocracking or hydrotreating can be generated by reforming the water-soluble fraction of bio-oil.

7 Claims, 3 Drawing Sheets

(56) References Cited

U.S. PATENT DOCUMENTS

| | | | | |
|---|---|---|---|---|
| 7,329,291 | B2 | 2/2008 | Nielsen et al. | |
| 2006/0013765 | A1 | 1/2006 | Litwin et al. | |
| 2006/0018823 | A1 | 1/2006 | Czernichowski et al. | |
| 2007/0225383 | A1 | 9/2007 | Cortright et al. | |
| 2008/0053870 | A1 * | 3/2008 | Marker et al. | 208/67 |
| 2008/0103344 | A1 | 5/2008 | Jones et al. | |
| 2008/0118429 | A1 | 5/2008 | Abbas et al. | |
| 2008/0216391 | A1 * | 9/2008 | Cortright et al. | 44/307 |

OTHER PUBLICATIONS

Czernick et al., "Overview of Applications of Biomass Fast Pyrolysis Oil", Energy & Fuels, 2004, 18, pp. 590-598.

Elliott et al., "Biomass Liquefaction Product Anaysis and Upgrading", Comptes Rendus de l'Atelier de Travail sur la Liquidfaction de la Biomasse, Report 23 130, NRCC: Sherbrooke, Quebec, Canada, Sep. 29-30, 1983, 11 pages.

Eilliott, "Historical Developments in Hydroprocessing Bio-oils", Energy & Fuels, 2007, 21, pp. 1792-1815.

Mohan et al., "Pyrolysis of Wood/Biomass for Bio-oil: A Critical Review", Engery & Fuels, 2006, vol. 20, pp. 848-889.

International Search Report and Written Opinion for International Application No. PCT/US2009/057459; International Filing Date Sep. 18, 2009; Date of Mailing Apr. 22, 2010; 13 pages.

* cited by examiner

PRODUCTION OF HYDROGEN, LIQUID FUELS, AND CHEMICALS FROM CATALYTIC PROCESSING OF BIO-OILS

STATEMENT REGARDING FEDERALLY SPONSORED RESEARCH OR DEVELOPMENT

This invention was made with U.S. Government support under Contract No. DE-FG02-07ER86324 awarded by the Department of Energy. The Government has certain rights in this invention.

CROSS-REFERENCE TO RELATED APPLICATIONS

This application is a National Stage filing under 35 U.S.C. 371 of International Patent Application No. PCT/US2009/57459, filed Sep. 18, 2009, which claims the benefit of U.S. Provisional Application No. 61/098,091, filed on Sep. 18, 2008, both of which are incorporated herein in their entirety.

BACKGROUND OF THE INVENTION

1. Field of the Invention

This invention relates to a method for production of hydrogen, hydrocarbons, and other by-products, and particularly to the production of hydrogen, liquid fuels, and other chemical fractions from catalytic processing of bio-oil.

2. Description of the Related Art

Hydrogen is an important feedstock for chemical manufacture and as a clean fuel in combustion engines and in fuel cells. Synthetic routes for commercial production of hydrogen have included catalytic steam reforming of $C_{1-4}$ hydrocarbons such as methane, ethane, butane, and the like; natural gas; liquefied petroleum gas (LPG); naphtha; and the like; alternatively, hydrogen may be obtained by partial oxidation of heavy oil residues and coal gasification. However, because of the prospect of eventual depletion of global petroleum reserves and accompanying high prices, development of alternative sources of hydrogen from renewable sources is desirable. One potential renewable source of petroleum derived products is bio-based matter, such as agricultural and forestry products. Use of bio-based products may potentially counteract, at least in part, the problems associated with depletion of the petroleum supply.

One bio-based product is bio-oil. Bio-oil is the condensed liquid oxygenated hydrocarbon by-product of the fast pyrolysis of biomass, and in particular, biomass from agricultural and forest product residue. During pyrolysis, the biomass is heated to moderate temperatures (450 to 650° C.) in the absence of any externally supplied oxygen. The vapors formed on heating of the biomass condensed quickly to provide bio-oil as a liquid. Bio-oil is a complex mixture of various compounds including water, guaiacols, catechols, syringols, vanillins, furancarboxaldehydes, and carboxylic acids including acetic acid, formic acid, and other carboxylic acids [Mohan, D., Pittman, C. U. and Steele, P. H., "Pyrolysis of Wood/Biomass for Bio-oil: A Critical Review," *Energy & Fuels,* 2006, vol. 20, pp. 848-889]. Bio-oil derived from fast pyrolysis of wood has an energy density about five times that of green wood, but is insoluble in hydrocarbon solvent and is acidic (with a pH of about 2 to about 3), is highly viscous, and the presence of oxygen containing compounds makes bio-oil thermally unstable. In addition, the high oxygen content of bio-oil also gives it a low energy density per unit volume or mass. For primarily these reasons, use of bio-oil as a fuel (e.g., gasoline or a heavy fuel oil such as diesel) or fuel additive is currently not feasible, and to be able to use bio-oil as liquid fuel it is necessary to convert it to a higher energy density, higher stability form. A representative comparison of composition and physical properties of bio-oil and heavy fuel oil is depicted in Table 1, below (reproduced from Czernik S. and Bridgewater A. V., "Overview of Applications of Biomass Fast Pyrolysis Oil", *Energy & Fuels,* 2004, 18, pp. 590-598).

TABLE 1

| | Bio-oil | Heavy fuel oil |
|---|---|---|
| Physical property | | |
| Moisture content (wt %) | 15-30 | 0.1 |
| pH | 2-3 | — |
| Specific gravity | 1.2 | 0.94 |
| Elemental composition (wt %) | | |
| C | 54-58 | 85 |
| H | 5.5-7.0 | 11 |
| O | 35-40 | 1.0 |
| N | 0-0.2 | 0.3 |
| Ash | 0-0.2 | 0.1 |
| High Heat Value (HHV; MJ/Kg*) | 16-19 | 40 |
| Viscosity (at 50° C. in cP) | 40-100 | 180 |
| Solids content (wt %) | 0.2-1 | 1 |
| Distillation residue (wt %) | up to 50 | 1 |

*Note:
units are in megajoules per kilogram (MJ/Kg).
**Note:
viscosity is reported in centipoise (cP).

To make bio-oil compatible with or similar to the conventional liquid fuels it is first necessary to deoxygenate it. Two main routes to achieve this are hydrotreating and catalytic cracking [Czernik, Id.]. In hydrotreating, oxygen is removed in the form of water in the presence of a catalyst at high temperature and high hydrogen pressure. Maggi and Delmon [Maggi, R. and Delmon, B., "A Review of Catalytic Hydrotreating Processes for the Upgrading of Liquids Produced by Flash Pyrolysis", in *Hydrotreatment and Hydroprocessing of Oil Fractions*, Froment, G. F., Delmon, B. and Grange, P. (Eds.), 1997, Elsevier Science B. V.] and Elliott [Elliott, D. C., Historical Developments in Hydroprocessing Bio-oils, *Energy & Fuels,* 2007,21, pp. 1792-1815] have reviewed the catalytic hydrotreating of bio-oil. In catalytic cracking, bio-oil has been passed over an acidic zeolite catalyst at high temperature (e.g. 450° C.) and atmospheric pressure. Simultaneous dehydration and decarboxylation reactions occur, and oxygen is removed in the form of $H_2O$, CO and $CO_2$ [Czernik and Bridgwater, Id.].

Elliott and Baker [Elliott, D. C. and Baker, E, G., "Biomass Liquefaction Product Analysis and Upgrading", *Comptes Rendus de l'Atelier de Travail sur la Liquidfaction de la Biomasse*, Report 23 130, NRCC: Sherbrooke, Quebec, Canada, Sep. 29-30, 1983, pp. 176-183] report hydrotreating bio-oil over a sulfided Co—Mo catalyst at 355° C. and 2,000 psi (13.8 MPa) with a liquid hourly space velocity (LHSV) of 0.35. As defined herein, LHSV which is generally expressed as v/v/h, g/g/h, or as $h^{-1}$, is the ratio of the hourly volume (or mass) of oil processed to the volume (or mass) of catalyst, and is a measure of the residence time of the liquid reactants in reactors, typically cylindrical reactors. An LHSV of 0.1 to 0.5 is typically used for vacuum residue feedstocks. Hydrogen consumption was found for the process to be 127 L/L of bio-oil, and a relatively low yield of 23% by mass was obtained for the liquid product (deoxygenated bio-oil). In addition, the catalyst bed and catalyst were plugged by heavy tar-like material (i.e., "coked), effectively blocking the active portions of the catalyst and preventing further catalytic cycling.

Elliott and Baker [Elliott, D. C. and Baker, E. G., "Process for Upgrading Biomass Pyrolyzates," U.S. Pat. No. 4,795,841, issued Jan. 3, 1989] further developed a two-step process for upgrading bio-oil using sulfided Co—Mo as the catalyst for both steps. In the process, bio-oil was initially subjected to mild hydrotreating at 300° C. to make a stabilized product. The stabilized product was then subjected to further hydrocracking at 350° C. and 2,000 psi (13.8 MPa). A relatively low LHSV of 0.07 volume of oil/volume of catalyst-h is used in the second step. About 75 wt % of the carbon is converted to an oil phase containing 2.3 wt % oxygen, with an overall hydrogen consumption of about 457 L/L of oil produced.

Aqueous-phase reforming (APR) of biomass-derived hydrocarbons is a novel process developed by Cortright et al. [Cortright, R. D., Davda, R. R. and Dumesic, J. A., "Hydrogen from Catalytic Reforming of Biomass-derived Hydrocarbons in Liquid Water," *Nature,* 2002, p. 418] to produce hydrogen by a low temperature (e.g., about 500K, or 228° C.) catalytic reforming of biomass-derived oxygenated compounds such as glucose, sorbitol, and the like, where platinum on alumina ($Pt/Al_2O_3$) is used as catalyst. For example, reforming of sorbitol to $H_2$ and $CO_2$ is described by the following balanced stoichiometric equation (1):

$$C_6H_{14}O_6(l)+6H_2O\ (l)\leftrightharpoons 13H_2+6CO_2 \qquad (1)$$

where conversion to a gas phase fraction is higher at 538K than that at 498K. At 538K, the % C in the gas phase effluent is 84% (compared to 50%C at 498K), and 90% C (compared to 61% C at 498K) as obtained for reforming of glucose and sorbitol, respectively. The gas phase contains $H_2$, $CO_2$, and $C_{1-6}$ alkanes in varying amounts.

The hydrogen production in the method of Cortright et al. is somewhat low compared with the percent carbon recovery, as measured by the hydrogen selectivity. Hydrogen selectivity is defined in equation (2) as:

$$H_2\ \text{Selectivity}=(\text{molecules } H_2 \text{ produced/C atoms in gas phase})*(1/RR)*100 \qquad (2)$$

where RR is the $H_2/CO_2$ Reforming Ratio, corresponding to 13/6 and 2 for sorbitol and glucose, respectively, and is a function of conversion of the feedstock from the solution to gas phase. For example, hydrogen selectivity by the method of Cortright is 50% and 36% for glucose at 498K and 538K respectively, and 66% and 46% for sorbitol 498K and 538K, respectively. However, application of such reformation reactions has generally been confined to model compounds and not to actual unrefined bio-oil with its accompanying complex lignin-derived feed and resulting char formation.

In addition, International Patent Application Publication No. WO 2008/069830 discloses aqueous phase reforming of various purified or semi-purified polyol starting materials, to provide hydrogen. Hence, the feed in this application is appears limited to polyols which are converted in the aqueous phase reforming step, and does not disclose the use of a functionally complex starting material in the feed, such as fractionated bio-oil.

Accordingly, there still remains a need in the art for a method of efficient production of fuels, including hydrogen and hydrocarbons, derived from bio-oils.

BRIEF SUMMARY OF THE INVENTION

The shortcomings of the prior art are overcome and additional advantages are provided through, in an embodiment, a method of generating hydrogen from a bio-oil, comprising: hydrogenating (i.e., mild hydrotreating of) a water-soluble fraction of the bio-oil with hydrogen in the presence of a hydrogenation catalyst, and reforming the water-soluble fraction by aqueous-phase reforming in the presence of a reforming catalyst, wherein hydrogen is generated by the reforming, and the amount of hydrogen generated is greater than that consumed by the hydrogenating.

In a further embodiment, the method comprises hydrocracking a lignin fraction of the bio-oil with hydrogen in the presence of a hydrocracking catalyst, wherein the lignin fraction of bio-oil is obtained as a water-insoluble fraction from aqueous extraction of bio-oil.

In another embodiment, a method of forming hydrogen and liquid fuel from bio-oil, comprises extracting bio-oil with water to form a water-soluble fraction and a lignin fraction, hydrogenating the water-soluble fraction with hydrogen in the presence of a hydrogenation catalyst, reforming the water-soluble fraction by aqueous-phase reforming (APR) in the presence of a reforming catalyst, and hydrocracking the lignin fraction with hydrogen in the presence of a hydrocracking catalyst, wherein hydrogen is generated by the reforming, and the amount of hydrogen generated is greater than that consumed by the hydrogenating and hydrocracking, and wherein liquid fuel is generated by the hydrocracking.

In another embodiment, a method of generating liquid fuel from bio-oil, comprises hydrocracking a water-insoluble lignin fraction of bio-oil with hydrogen in the presence of a hydrocracking catalyst, wherein the hydrogen is generated by hydrogenating a water-soluble fraction of the bio-oil with hydrogen in the presence of a hydrogenation catalyst, and reforming the hydrogenated water-soluble fraction of the bio-oil by aqueous-phase reforming in the presence of a reforming catalyst, wherein the amount of hydrogen generated by aqueous-phase reforming is greater than that consumed by the hydrogenating and hydrocracking, and wherein liquid fuel is generated by the hydrocracking.

In another embodiment, a method of generating $C_{5-25}$ alkanes from bio-oil, comprises hydrotreating a water-insoluble lignin fraction of bio-oil with hydrogen in the presence of a hydrotreating catalyst, wherein the hydrogen is generated by hydrogenating a water-soluble fraction of the bio-oil with hydrogen in the presence of a hydrogenation catalyst, and reforming the hydrogenated water-soluble fraction of the bio-oil by aqueous-phase reforming in the presence of a reforming catalyst, wherein the amount of hydrogen generated by aqueous-phase reforming is greater than that consumed by the hydrogenating and hydrotreating, and wherein $C_{5-25}$ alkanes is generated by the hydrotreating.

In another embodiment, a method of generating a chemical fraction from a bio-oil, comprises: hydrogenating the water soluble fraction in a first hydrogenation in the presence of a first hydrogenation catalyst to form a first hydrogenated product, hydrogenating at least a portion of the first hydrogenated product in the presence of a second hydrogenation catalyst to form a second hydrogenated product, and reforming a portion of the first hydrogenation product by aqueous-phase reforming in the presence of a reforming catalyst; wherein hydrogen is generated by the reforming, at least a portion of the hydrogen generated by reforming is used the first hydrogenation, the second hydrogenation, or both the first and second hydrogenations, and wherein the chemical fraction comprises alcohols, diols, polyols, furan derivatives, or a combination comprising at least one of the foregoing.

In another embodiment, a method of forming hydrocarbons from bio-oil, comprises: extracting bio-oil with water to obtain a water-soluble fraction and a lignin fraction, hydrogenating the water-soluble fraction with hydrogen in the presence of a hydrogenation catalyst, reforming a portion of the water-soluble fraction by aqueous-phase reforming (APR) in the presence of a reforming catalyst, optionally reacting, in the presence of an aldol condensation catalyst, a portion of hydrogenated water soluble fraction prepared by hydrogenating the water-soluble fraction of the bio-oil, and reacting, in the presence of hydrocracking catalyst, a portion of hydrogenated water soluble fraction prepared by hydrogenating the water-soluble fraction of the bio-oil, wherein hydrogen is generated by the reforming, and at least a portion of the hydrogen generated by the reforming is used in the hydrogenating, the reacting in the presence of hydrocracking catalyst, or both the hydrogenating and the reacting in the presence of hydrocracking catalyst; and wherein hydrocarbons are generated by the reacting in the presence of the hydrocracking catalyst, and wherein when reacting in the presence of an aldol condensation is carried out, hydrocarbons comprising $C_{5-9}$ alkanes are generated, or wherein when reacting in the presence of an aldol condensation is not carried out, hydrocarbons comprising $C_{1-6}$ alkanes are generated.

A description of the figures, which is meant to be exemplary and not limiting, are provided below.

Figure 1:
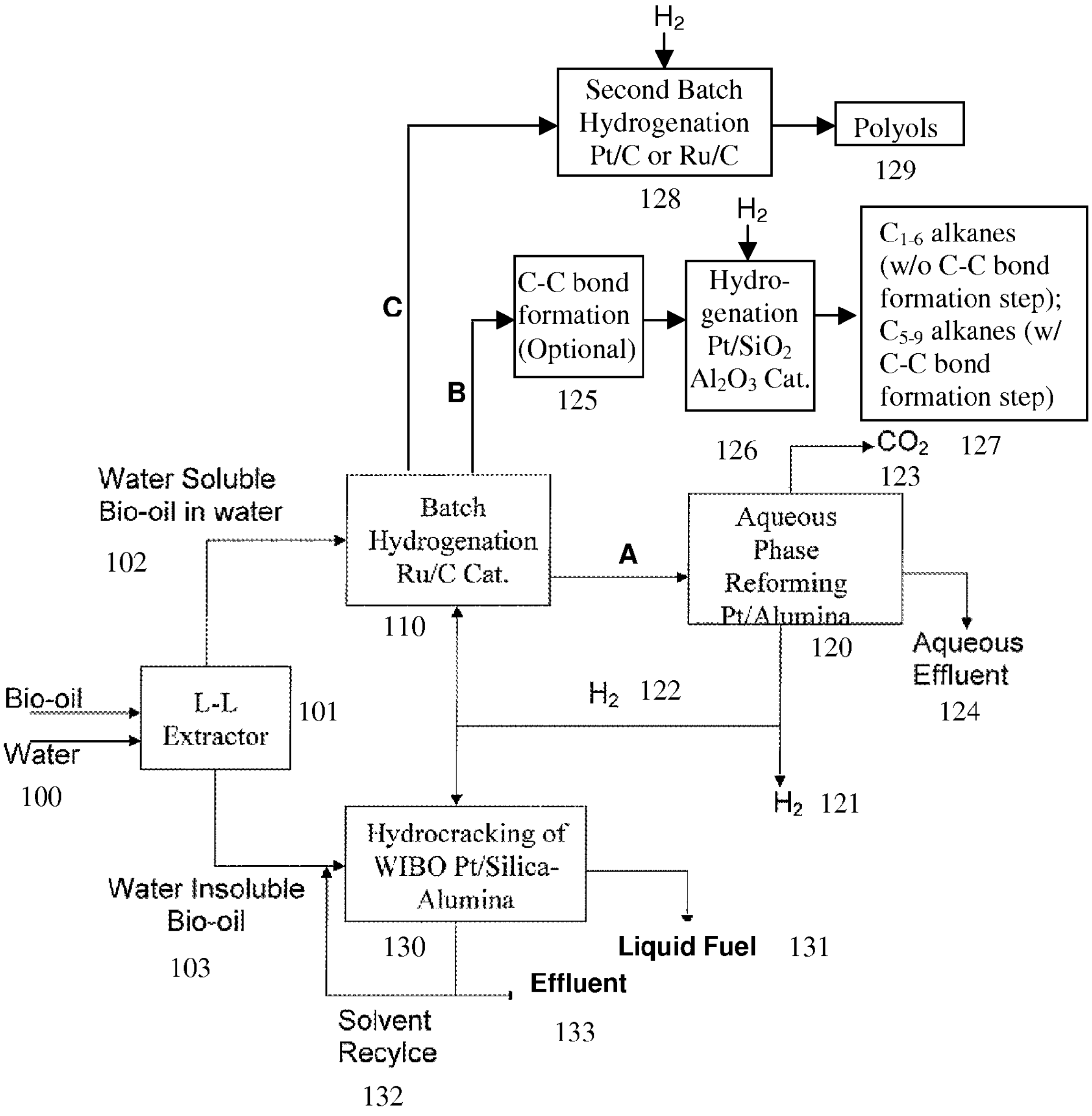
FIG. 1 illustrates an exemplary process for preparing hydrogen and deoxygenated hydrocarbon products from bio-oils according to the method.

The above described and other features are exemplified by the following detailed description.

DETAILED DESCRIPTION OF THE INVENTION

The shortcomings of the prior art are overcome and additional advantages are provided through application of aqueous-phase reforming (APR) to a hydrogenated (i.e., mildly hydrotreated) water-soluble fraction of bio-oil to generate hydrogen. The hydrogen generated from APR of the water-soluble fraction is further used in part for catalytic hydrotreating of lignin fraction of bio-oil to generate liquid fuel.

An initial hydrogenation of the water-soluble fraction of the bio-oil is advantageously carried out at low temperatures (less than about 200° C.) to provide stable species in the water-soluble fraction, prior to APR. The hydrogen generated in turn by APR of the water-soluble fraction is further used in part for catalytic hydrocracking of the lignin fraction (i.e., the water-insoluble fraction) of the bio-oil to deoxygenate and reduce the lignin fraction of the bio-oil to generate a liquid fuel.

Bio-oil is obtained as a brown, viscous, and acidic oil from the fast pyrolysis of biomass. Biomass includes, but is not limited to, plants, trees, crops, crop residues, grasses, forest and mill residues, wood and wood waste (e.g., saw dust), paper mill waste, waste paper, and combinations thereof Biomass includes solids that are not soluble in water. In particular, biomass can include, but is not limited to, cellulose, lignin, hemicellulose, fatty acids, and/or triglycerides; however, the components of the biomass and the amount of each component in the biomass will vary based on the source of the biomass. While any biomass may be used, particularly useful biomass is that derived from processing of trees (e.g., sawdust), as such wood-based biomass contains a higher energy density than that derived from agricultural waste. Trees useful as sources of biomass include, but are not limited to, pine trees and pine tree by-products and other tree or plant material containing cellulose, lignin, and hemicellulose. A particularly useful and readily available biomass is sawdust from the commercial processing of pine trees.

In the method as disclosed herein, the bio-oil is separated into a water-soluble fraction (sometimes referred to herein as "water-soluble bio-oil", abbreviated "WSBO") and a water-insoluble fraction (also referred to herein as the "lignin fraction", "water-insoluble bio-oil", and abbreviated "WIBO"), by an aqueous extraction process. Fractionation of the crude bio-oil is typically carried out by aqueous extraction by combining bio-oil and water in batch mode in a suitable vessel, such as a liquid-liquid extractor, and allowing the insoluble portions to phase-separate to provide the aqueous phase containing the water-soluble fraction enriched in water-soluble components, and the water-insoluble phase. The amount of water used in the extraction is selected in a proportion that will provide an optimal phase separation and extraction. In an embodiment, the proportion by volume of bio-oil to water for a batch mode aqueous extraction is 0.1:1 to 4:1, more specifically 0.1:1 to 3:1, still more specifically 0.1:1 to 2:1, and still yet more specifically 0.1:1 to 1:1. The extraction may further be repeated multiple times using the same or different proportions of water-insoluble fraction to water, and the resulting water-soluble fractions combined. Volume of the resulting aqueous layers may optionally be increased by addition of water, or decreased by evaporation of the water by lyophilization or distillation at elevated temperature under vacuum or at atmospheric pressure, to achieve a concentration of water-soluble components in the water-soluble fraction that is suitable for further processing. Alternatively, the bio-oil may be extracted by use of a continuous extraction system in semi-batch or continuous flow mode.

Additives may be included in the aqueous phase to facilitate the separation of the water-soluble and insoluble phases, including surfactants, anti-flocculants, anticoagulants, solvents, acids, bases, or salts. In particular, salts and/or buffering agents may be added to increase the ionic strength of the aqueous phase to facilitate phase separation, and to adjust the pH of the resulting aqueous phase.

Extraction may be carried out at ambient temperature, elevated temperature (e.g., less than or equal to about 80° C.) or reduced temperature (e.g., temperatures greater than or equal to about 5° C.), as required to achieve optimal extraction and phase-separation result. In an embodiment, the extraction is carried out at ambient (room) temperature.

To illustrate the foregoing description, in a specific method, bio-oil is mixed with water, where the weight ratio of bio-oil to water is in the range of about 0.1:1 to about 0.5:1. The resulting mixture is then centrifuged and the upper (water-soluble fraction) layer is separated from the lower (lignin fraction) layer by an appropriate method (e.g., decanting).

The water-soluble fraction of the bio-oil is then stabilized by hydrogenation. Hydrogenation is typically carried out at medium to high pressure (up to about 2,000 psi; about 13.8 MPa), and in a sealed hydrogenation vessel, in the presence of a hydrogenation catalyst. Hydrogenation reactors vary widely in size from small (laboratory) scale vessels of e.g., 1 L volume, to pilot and production scale reactors of 1,000 liters or more. Prior to addition of hydrogen, the water-soluble fraction is first degassed to remove residual gases, especially oxygen, and other volatiles, and may in an embodiment be further treated to remove other undesired components (e.g., catalyst poisons such as sulfur compounds) by processes such as refining, chemical treatment or ion exchange.

Reactor pressure during the hydrogenation step is a function of the partial pressures of volatile components (i.e., water, solvents, low molecular weight volatile components, residual dissolved gases, and the like) at the desired operating temperature, in combination with the pressure contributed by the added hydrogen. In an embodiment, pressure in the reactor during hydrogenation of the water-soluble fraction is maintained at about 500 to about 2,000 psi (about 3.4 to about 13.8 MPa), specifically about 700 to about 1,500 psi (about 4.8 to about 10.3 MPa), more specifically about 800 to about 1,200 psi (about 5.5 to about 8.3 MPa), and still more specifically about 900 to about 1,100 psi (about 6.2 to about 7.6 MPa). Hydrogen is added either incrementally or continuously to the hydrogenation reactor to maintain the pressure at the desired level. In an embodiment, the pressure in the hydrogenation reactor varies by less than or equal to 10%, specifically less than or equal to 7%, more specifically less than or equal to 5%, and still more specifically less than or equal to 2%, over the course of the hydrogenation reaction.

The temperature that the hydrogenation of the water-soluble fraction is carried out, is selected to maintain a desired forward hydrogenation reaction resulting in appropriate selective conversion of the unstable species within the water-soluble fraction. In an embodiment, the temperature of the hydrogenation reaction is maintained at less than about 200° C., specifically about 120 to about 180° C., more specifically about 130 to about 180° C., still more specifically about 140 to about 180° C., and still yet more specifically about 150 to about 180° C. In a specific embodiment, the hydrogenating is preferably carried out at a temperature of less than or equal to 175° C. The hydrogenation step is carried out for an amount of time necessary to achieve the requisite degree of hydrogenation, and may be up to about 10 hours, depending on factors such as reaction scale; mixing; catalyst type; activity and amount; or any other factors significantly affecting the hydrogenation. In an embodiment, the hydrogenation is carried out for about 0.5 to about 5 hours, more specifically about 0.75 to about 4 hours, and still more specifically about 1 to about 3 hours.

Catalysts useful for the hydrogenation (i.e., hydrogenation catalysts) may be used without limitation, provided the required conversion and environmental stability (e.g., maintenance of catalytic activity, resistance to fouling, poisoning, and the like) and the desired performance under the reaction conditions disclosed are met. The hydrogenation catalyst may be used as a heterogeneous or homogeneous hydrogenation catalyst, or a combination. In an embodiment, a heterogeneous hydrogenation catalyst is used. Heterogeneous catalysts come typically as a porous metal foam, a colloid, or as a catalyst metal or metal salt on a solid support. In an embodiment, the hydrogenation catalyst metal is adhered to a support, where the support is silica, alumina, zirconia, titania, ceria, carbon (including activated carbon), silica-alumina, silica nitride, boron nitride, zeolites, or a combination comprising at least one of the foregoing solid materials.

The hydrogenation catalyst used herein comprises, in an embodiment, one or more Group VIII transitional metals, alloys thereof, mixtures thereof, or a combination comprising an alloy or admixture of a Group VIII transition metal with a Group VIIB metal. Group VIII metals useful for hydrogenation catalysts include, but are not limited to, platinum, palladium, nickel, ruthenium, rhodium, iridium, salts thereof, complexes thereof, mixtures thereof, and alloys thereof. Group VIIB metals include, manganese and rhenium, or combinations thereof with other metals such as copper, zinc, or tin. In an exemplary embodiment, the Group VIII hydrogenation catalyst metal is ruthenium. Exemplary hydrogenation catalyst metals and complexes include for example Pt, $HPtCl_6$, Ru, $RuCl_3$, Rh, Ir, Pd, $PdCl_2$, $Pd(acetate)_2$, Pd(acetyl acetonate)$_2$, Ni, $Ni(acetate)_2$, $NiCl_2$, and the like. In a specific exemplary embodiment, a useful hydrogenation catalyst for hydrogenation of the water-soluble fraction is ruthenium on carbon (Ru/C).

The hydrogenation catalyst on solid support may include the catalyst metal present in an amount of up to 10 weight percent (wt %) based on the total weight of catalyst metal and support. In an embodiment, the hydrogenation catalyst metal is present in 0.1 to 10 wt %, specifically 0.5 to 9 wt %, more specifically 0.75 to 8 wt %, and still more specifically 2 to 7 wt %, based on the total weight of hydrogenation catalyst metal and support. The catalyst may have a surface area of 800 to 2,000 $m^2/g$, and in an embodiment, desirably has a particle size corresponding to a average largest dimension of the particle of less than or equal to 50 μm, specifically 1 to 40 μm, more specifically 5 to 30 μm, and still more specifically 10 to 25 μm, where a powdered catalyst is used; or alternatively, in another embodiment, less than or equal to about 5 mm, and specifically about 0.1 to about 5 mm, where a granular support is desired. It will be appreciated by one skilled in the art that the particular size, surface area, and quantity of the hydrogenation catalyst used will be determined by the skilled practitioner as required by the needs of the particular application, and is not therefore to be considered as otherwise limited to the embodiments described herein.

In an exemplary embodiment of the method of the hydrogenation of the water-soluble fraction, the water-soluble fraction is subjected to low temperature (e.g., about 170 to about 180° C.) batch hydrogenation, wherein thermally unstable compounds present in the water-soluble fraction of the bio-oil are converted to more stable compounds. The low temperature hydrogenation step is carried out at a pressure of about 800 to about 1,200 psi (about 5.5 to about 8.3 MPa) and is catalyzed by ruthenium on carbon (Ru/C) as the hydrogenation catalyst.

In an embodiment, the hydrogenated water soluble fraction of bio-oil may be subject to a two-stage hydrogenation step to form a chemical fraction, such as polyols. In an embodiment, a catalyst useful for forming polyols includes those useful in the initial hydrogenation of the water-soluble fraction of bio-oil. In particular, in an exemplary embodiment, a useful catalyst for the second hydrogenation is ruthenium on carbon. Where a ruthenium on carbon catalyst is used, a greater distribution of low carbon species is obtained (e.g., gaseous carbon species). In another exemplary embodiment, a useful catalyst for the second hydrogenation is platinum on carbon. Where a platinum on carbon catalyst is used, a greater distribution of higher carbon species is obtained (e.g., polyols).

Thus, in an embodiment, a two stage hydrogenation of the water-soluble bio-oil fraction may be used to produce a chemical fraction, where a chemical fraction includes alcohols, diols, polyols, furan derivatives, and the like, or a combination comprising at least one of the foregoing chemicals. This is accomplished by, in an embodiment, hydrogenating the water soluble fraction in a first hydrogenation in the presence of a first hydrogenation catalyst to form a first hydrogenated product, and hydrogenating at least a portion of the first hydrogenated product in the presence of a second hydrogenation catalyst to form a second hydrogenated product. The first and second hydrogenation catalysts may be the same or different, and are as described above. In a specific embodiment, the first hydrogenation catalyst is Ru/C and the second hydrogenation catalyst is Ru/C or Pt/C.

The second hydrogenated product, in this way, comprises chemical fractions including alcohols, diols, polyols, furan derivatives, or a combination comprising at least one of the foregoing.

After hydrogenation, the hydrogenation catalyst is filtered out and recycled and the hydrogenated water-soluble fraction is then subject to a catalytic aqueous-phase reforming (APR) reaction, in the presence of a reforming catalyst. APR may be carried out in batch mode in which the hydrogenated water-soluble fraction is combined with the reforming catalyst in a reactor, or is flowed through a bed of reforming catalyst in a continuous mode though a tubular reactor. In an embodiment, a tubular or cylindrical reactor is used, where the hydrogenated water-soluble fraction is passed through a bed of the reforming catalyst. The LHSV for the reaction is maintained to provide the desired conversion of hydrogenated water-soluble fraction to product, while minimizing undesired side reactions. In an embodiment, an LHSV of about 0.1 to about 1.5 g/g-h, specifically about 0.3 to about 1.2 g/g-h, more specifically about 0.5 to about 1.0 g/g-h, and still more specifically about 0.6 to about 0.8 g/g-h, is maintained during APR. APR is carried out at a temperature of about 200 to about 280° C., specifically about 225 to about 280° C., more specifically about 250 to about 275° C., and still more specifically about 260 to about 270° C., and at a pressure of about 300 to about 1,200 psi (about 2.1 to about 8.3 MPa), specifically about 500 to about 1,100 psi (about 3.4 to about 7.6 MPa), more specifically about 600 to about 1,000 psi (about 4.1 to about 6.9 MPa), more specifically about 700 to about 900 psi (about 4.8 to about 6.2 MPa) and still more specifically about 750 to about 850 psi (about 5.2 to about 5.9 MPa).

In another embodiment, the water-soluble fraction may be treated using a resin prior either prior to or after hydrogenating and prior to aqueous-phase reforming. It has advantageously been found that treating the water-soluble fraction of bio-oil with an ion exchange resin, can provide a pH adjustment, ash removal, purification of the water-soluble fraction (where an activated carbon is used), reduction of metal contaminants, and removal of excess moisture where a dehydrated ion exchange resin. The ion exchange resin may be a strong acid cation exchange resin, an activated carbon resin or other adsorbent resin, a mixed cation/anion exchange resin, or other rein. Performing the resin treatment before or after the hydrogenation step can result in improved aqueous-phase reforming performance. In an embodiment, resin treatment of a water-soluble fraction of bio-oil, has, after hydrogenating (before or after resin treatment), improved reforming performance, relative to a water-soluble fraction of bio-oil that has not undergone resin treatment. In an exemplary embodiment, an ion exchange resin that is useful for resin treatment is DOWEX® DR-G8 resin (available from Dow).

During APR, the reforming catalyst may be any catalyst system that is capable of cleaving the C—C bonds of a given oxygenated hydrocarbon compound faster than the C—O bonds of that compound under the chosen reaction conditions. Preferably, the metallic catalyst should have minimal activity toward the cleavage of C—O bonds. Use of a catalyst system having high activity for C—O bond cleavage can result in the formation of undesired by-products, such as alkanes. In an embodiment, the APR reaction has a carbon selectivity for alkane formation (i.e., C—O over C—C bond cleaving selectivity) of less than or equal to 35%, specifically less than or equal to 30%, and still more specifically less than or equal to 25%. Similarly, in an embodiment, the APR reaction has a carbon selectivity for carbon dioxide formation (i.e., C—C over C—O bond cleaving selectivity) of greater than or equal to 65%, specifically greater than or equal to 70%, and more specifically greater than or equal to 75%.

The reforming catalyst used herein comprises one or more Group VIII transitional metals, alloys thereof, and mixtures thereof. In an embodiment, exemplary catalyst metals include nickel, iron, cobalt, palladium, platinum, ruthenium, rhodium, and iridium, alloys thereof, and mixtures thereof. In an exemplary embodiment, the reforming catalyst metal is platinum.

The Group VIII transition metal reforming catalyst may if desired be alloyed or admixed with a metal such as a Group IB metal, Group IIB metal, or a Group VIIB metal. Exemplary Group IB, Group IIB, and Group VIIB metals include copper, zinc, and rhenium, alloys thereof, and mixtures thereof. The amount of these added metals should not exceed about 30% of the weight of the Group VIII transition metal catalyst present.

The reforming catalyst may be a heterogeneous catalyst or homogeneous catalyst. In an embodiment, a heterogeneous catalyst is used, where the heterogeneous catalyst is a reforming catalyst metal or metal salt on solid support. In an embodiment, the catalyst metal is adhered to a support, where the support is silica, alumina, zirconia, titania, ceria, carbon (including activated carbon), silica-alumina, silica nitride, boron nitride, zeolites, or a combination comprising at least one of the foregoing solid materials. In an embodiment, loaded onto a support, the reforming catalyst metal is present in an amount of from about 0.1 to about 20 wt % based on the total weight of the reforming catalyst metal and support, specifically about 0.1 to about 10 wt %, and more specifically about 0.5 to about 5 wt %. Alternatively, where a support is not used, the reforming catalyst may be used as a fine powder (e.g., having a particle size of less than or equal to about 50 μm, specifically less than or equal to about 25 μm), as a sintered metal, or as a metal foam.

In a specific embodiment, reforming catalysts include solid supported catalysts such as ruthenium on silica, palladium on silica, iridium on silica, platinum on silica, rhodium on silica, cobalt on silica, nickel on silica, iron on silica, nickel-palladium on silica, nickel-platinum on silica, and ruthenium-palladium on silica, ruthenium on alumina, palladium on alumina, iridium on alumina, platinum on alumina, rhodium on alumina, cobalt on alumina, nickel on alumina, iron on alumina, nickel-palladium on alumina, nickel-platinum on alumina, and ruthenium-palladium on alumina. In a specific exemplary embodiment, the reforming catalyst is platinum on alumina ($Pt/Al_2O_3$).

The APR reaction is desirably carried out to favor hydrogen formation over the formation of alkanes. Where not otherwise specified, conditions such as feedstock concentration and metering, pre-heating of feeds, catalyst condition, and the like, will be carried out with the knowledge of the practitioner in the art, to provide the desired reaction performance.

In an embodiment, the hydrogen selectivity of the APR reaction is greater than or equal to about 60%, specifically greater than or equal to about 65%, and still more specifically greater than or equal to about 68%.

It has surprisingly been found that hydrogenating the water-soluble fraction of bio-oil prior to APR results in minimal or no undesired side-product formation, prolongs the active lifetime of the reforming catalyst, and provides greater hydrogen yield for the APR reaction compared with reforming of the non-hydrogenated water-soluble fraction of bio-oil. Hydrogenating the water-soluble fraction is particularly advantageous for applications in which the reforming is performed with water-soluble bio-oil fractions having a higher bio-oil solute concentration of reformable species (e.g., greater than or equal to about 5% by weight bio-oil solute). While not wishing to be bound by theory, it is believed that hydrogenation of the water-soluble fraction prior to APR converts thermally unstable compounds present in the water-soluble fraction that may be associated with catalyst coking and premature reaction into more stable compounds that either react with the reforming catalyst with fewer or no by-products, thereby increasing overall reforming yield for the hydrogenated water-soluble fraction in a subsequent reforming reaction. Further, while bio-oil contains both sugars (e.g., glucose, and dehydrated sugars such as levoglucosan) and sugar alcohols (e.g., sorbitol), in addition to a myriad of other components, it has been found that the sugar alcohols have higher hydrogen selectivities upon reforming than the sugars. Hydrogenation further enriches the water-soluble fraction of bio-oil in sugar alcohols, as well as in other polyols such as, for example, ethylene glycol, propylene glycol, glycerol, butanediols, and the like, where the increased amounts of such sugar alcohols and polyols in the water-soluble fraction accordingly enhances hydrogen selectivity during reforming. While minimizing the concentration of solute in the water-soluble bio-oil fraction may reduce or slow the progress of catalyst coking as well, conducting the reforming reaction at a low solute concentration (at least as low as about 5% by weight) is nonetheless disadvantageous in that the reforming reaction is inefficient, resulting in an undesirably low hydrogen selectivity of less than 60%, and coking of the catalyst still occurs, shortening the useful lifetime of the reforming catalyst and thereby limiting the usefulness of the process. Hydrogenation of the water-soluble fraction of bio-oil has thus been found to render the water-soluble fractions suitable for aqueous-phase reforming while maintaining catalyst activity and a viable hydrogen selectivity.

In an exemplary embodiment of the APR, the hydrogenated water-soluble bio-oil is subjected to continuous flow APR in the presence of a reforming catalyst. The reforming catalyst is, in an exemplary embodiment, platinum on alumina ($Pt/Al_2O_3$). Aqueous-phase reforming is carried out in an exemplary process at a temperature of from about 225 to about 265° C. and a pressure of about 380 to about 1,200 psi (about 2.6 to about 8.3 MPa), using as a reactor a continuous flow fixed bed reactor. In other embodiments, it will be appreciated by one skilled in the art that any reactor design suitable for APR may be used, such as for example a fluidized bed reactor.

Thus, in an embodiment, a method of generating hydrogen from bio-oil, comprises hydrogenating a water-soluble fraction of bio-oil using hydrogen and a hydrogenation catalyst, and reforming the water-soluble fraction by aqueous-phase reforming (APR). In an embodiment, hydrogen is generated by the reforming. In another embodiment, the amount of hydrogen generated is greater than that consumed by the hydrogenating. Also in an embodiment of the method, hydrogen generated by APR reaction of the water-soluble fraction is used in subsequent and/or previous process step(s). In a specific embodiment, the hydrogen generated by APR of the water-soluble fraction is used to hydrogenate a water-soluble fraction of bio-oil.

Where a two-stage hydrogenation is carried out of the initial water-soluble bio-oil fraction, the hydrogen used in the first and second hydrogenations may be introduced from an external source, or may be produced by reforming of the hydrogenated product from the first hydrogenation as discussed above. In an embodiment, at least a portion of hydrogen used in a two-stage hydrogenation, i.e., the first and second hydrogenations, is generated by reforming, and specifically, by reforming all or part of the first hydrogenated product obtained by the first hydrogenation of the water soluble bio-oil fraction.

In a further embodiment, the water-insoluble fraction of the bio-oil (i.e., the lignin fraction) can be processed into various hydrocarbon fractions by a hydrogenation/cleaving, (i.e., hydrocracking), process, to break down the more viscous, higher molecular weight species present in the lignin fraction of the bio-oil to lighter, more volatile components suitable for use as fuels. The lignin fraction, sometimes also referred to as "water insoluble bio-oil" and abbreviated as "WIBO", is as described above, a highly viscous, brown colored liquid comprising compounds such as oligomeric lignins. In a hydrocracking process, the lignin fraction of bio-oil is passed through a catalyst bed in, in an embodiment, a heated tube reactor run at high pressure (e.g., greater than about 1,000 psi; about 6.9 MPa) and temperature (e.g., greater than about 300° C.). One skilled in the art will appreciate that the hydrocracking may be run using any reactor design and process suitable to the production of hydrocracked alkane fractions of fuel-grade quality.

Thus in an embodiment, hydrocracking of the lignin fraction of bio-oil is carried out with a catalyst and hydrogen, wherein the lignin fraction of bio-oil is obtained as a water-insoluble fraction from aqueous extraction of bio-oil. In another embodiment, a liquid hydrocarbon product is obtained from the hydrocracking. In another embodiment, the liquid hydrocarbon product comprising gasoline (a hydrocarbon fraction having a composition comparable to that obtained from distilling petroleum at about 50 to about 200° C., i.e., comprising hydrocarbons of about $C_{5-12}$) grade product, diesel (a hydrocarbon fraction having a composition comparable to that obtained from distilling petroleum at about 250 to about 350° C., i.e., comprising hydrocarbons of about $C_{10-15}$ with about a 75% alkane content and about 25% aromatic content) grade product, or a combination of gasoline grade product and diesel grade product.

In an exemplary hydrocracking process, the higher molecular weight oligomeric fractions undergo bond breaking, i.e., are "cracked" to cleave a C—C bond, in the oligomer, followed by in situ catalytic hydrogenation to trap any radicals generated and to reduce unsaturated (e.g., vinyl and olefinic) groups to saturated alkanes. In the hydrocracking process, it is useful for the lignin fraction to have a low viscosity to increase the contact of the lignin fraction with the catalyst surface and thereby facilitate the hydrogenation process. The lignin fraction may be diluted with a non-reactive solvent (diluent) to decrease the viscosity of the resulting mixture and improve processability, prior to subjecting the lignin fraction to hydrocracking. In an embodiment, a $C_{1-8}$ alcohol solvent may be used as diluent of the lignin fraction. In a specific embodiment, methanol, ethanol, or butanol may be used. The weight ratio of lignin fraction to diluent may be, in an embodiment, from about 1:1 to about 1:50, specifically about 1:10 to about 1:40, more specifically about 1:15 to about 1:30, and still more specifically about 1:20 to about 1:25. The lignin fraction (including diluent or without) is desirably vacuum treated or sparged with an inert gas (i.e., nitrogen or helium) to remove any dissolved gases, especially hydrogen and/or oxygen, and to thereby remove any contaminants that may contribute to a premature combustion hazard during the hydrocracking.

In an embodiment, the hydrocracking is desirably carried out at a pressure of about 1800 to about 4,000 psi (about 5.5 to about 27.6 MPa), specifically about 1,200 to about 2,800 psi (about 8.3 to about 19.3 MPa), and more specifically about 1,500 to about 2,500 psi (about 10.3 to about 17.2 MPa). Also in an embodiment, the hydrocracking is carried out at a temperature of about 200 to about 600° C., specifically about 250 to about 550° C., and more specifically about 300 to about 500° C. Hydrogen is fed to the hydrocracking reaction at a rate sufficient to maintain the total desired pressure of the system.

The hydrocracking catalyst used in the hydrocracking process comprises one or more Group VIII transitional metals, alloys thereof, mixtures thereof, or a combination comprising an alloy or admixture of a Group VIII transition metal with a Group VIIB metal. In an embodiment, exemplary Group VIII catalyst metals include nickel, palladium, platinum, ruthenium, rhodium, and iridium, alloys thereof, and mixtures thereof. In another exemplary embodiment, the Group VIIB metal is rhenium. In an exemplary embodiment, the hydrocracking catalyst metal is platinum.

The hydrocracking catalyst may, as for the reforming catalyst, be a heterogeneous catalyst or homogeneous catalyst. In an embodiment, a heterogeneous catalyst is used, where the heterogeneous catalyst is a hydrocracking catalyst metal or metal salt is provided alone or in combination with an acidic support, acid, or combination of acidic support and acid. In an embodiment, the catalyst metal is adhered to a solid support, where the support is silica, alumina, zirconia, titania, ceria, carbon (including activated carbon), silica-alumina, silica nitride, boron nitride, zeolites, or a combination comprising at least one of the foregoing solid materials. In an embodiment, loaded onto a support, the metallic catalyst is present in an amount of from about 0.1 to about 20 wt % based on the total weight of the hydrocracking catalyst metal and support, specifically about 0.1 to about 10 wt %, and more specifically about 0.5 to about 5 wt %. Alternatively, where a support is not used, the hydrocracking catalyst may be used as a fine powder (e.g., having a particle size of less than about 50 μm, specifically less than about 25 μm), as a sintered metal, or as a metallic foam.

In a specific embodiment, hydrocracking catalysts include solid supported catalysts such any of the above hydrocracking metals on silica, alumina, or silica-alumina. In a specific exemplary embodiment, the hydrocracking catalyst is platinum on silica-alumina ($Pt/SiO_2—Al_2O_3$).

The hydrocracking reaction is desirably carried out on the lignin fraction of bio-oil to provide hydrocarbon fractions in the desired favor hydrogen formation over the formation of alkanes. Where not otherwise specified, conditions such as feedstock concentration and metering, pre-heating of feeds, catalyst condition, and the like, will be supplied by the knowledge of the practitioner in the art, to adjust these parameters not otherwise specified to provide the desired reaction performance.

In another embodiment, the lignin fraction may instead be hydrotreated to provide saturated hydrocarbons such as higher branched, cyclic, or linear alkanes (e.g., $C_{5-25}$ alkanes and cycloalkanes, or even higher alkanes of $>C_{25}$), acids and/or esters of low to higher linear carboxylic acids (e.g., $C_{4-25}$ carboxylic acids and their alkyl esters), and phenolic compounds.

Surprisingly, it was found that hydrotreating the lignin fraction provides higher alkanes, which predominate over phenolic species. These alkanes can be added to fuels such as diesel fuel, or cracked (e.g., by hydrocracking) to generate lower carbon gasoline-range alkane fractions.

Exemplary products from hydrotreating lignin fractions include $C_{5-25}$ cycloalkanes including cyclopentane cyclohexane, methyl-, ethyl- or propyl-substituted cyclopentanes and cyclohexanes, and the like, and combinations comprising at least one of the foregoing; $C_{5-25}$ alkanes such as n-hexadeacane, n-heptadecane, n-octadecane, n-$C_{22}$ alkane carboxylic acids and alkyl esters thereof such as methyl, ethyl, propyl esters, and the like, and a combination comprising at least one of the foregoing; and few higher alkanes; $C_{4-25}$ carboxylic acids and/or esters such as ethyl butanoate, pentanoic acid, heptanoic acid, octanoic acid, nonanoic acid, and the like, or a combination comprising at least one of the foregoing; phenols such as methyl-, dimethyl-, or ethylphenol, methoxy- or ethoxyphenol, and the like, or a combination comprising at least one of the foregoing; and combinations comprising at least one of the foregoing exemplary products.

Hydrotreating may be carried out with a catalyst and hydrogen, wherein the lignin fraction of bio-oil is obtained as a water-insoluble fraction from aqueous extraction of bio-oil. In another embodiment, a liquid hydrocarbon product is obtained from the hydrotreating. In a specific embodiment, product comprising $C_{5-25}$ saturated linear alkanes is produced from a lignin fraction with predominantly linear alkane precursor content and low aromatic content. As defined herein, low aromatic content means less than or equal to 15%, specifically less than or equal to 12%, and more specifically less than or equal to 10% based on total carbon content (by weight). In another specific embodiment, alkane product comprising gasoline fraction $C_{5-12}$ linear or branched alkanes is produced by hydrocracking the hydrotreated lignin fraction.

Thus, in an embodiment, hydrotreating of the lignin fraction further comprises hydrotreating a lignin fraction of the bio-oil with hydrogen in the presence of a hydrotreating catalyst, wherein the lignin fraction of bio-oil is obtained as a water-insoluble fraction from aqueous extraction of bio-oil. In an embodiment, the hydrogen used in the hydrotreating is generated by reforming of the aqueous soluble fraction of the bio-oil.

In an embodiment, the hydrotreating catalyst may be a Group VII or Group VIII catalyst similar to or the same as that used for hydrocracking, wherein a neutral or acidic support is used. In a specific embodiment, the catalyst is a supported platinum catalyst. In a specific embodiment, the support may be carbon, silica, alumina, niobium phosphate, or zirconium phosphate. In an exemplary embodiment, a useful hydrotreating catalyst is 5% by weight $Pt/ZrPO_4$.

In another embodiment, hydrotreating may be carried out at a temperature of 200 to 400° C., specifically 250 to 350° C., more specifically 275 to 325° C., and still more specifically 290 to 325° C. In another embodiment, hydrotreating is carried out at a pressure of 500 to 1,500 psi (3.45 to 10.34 MPa), specifically 700 to 1,200 psi (4.83 to 8.27 MPa), and more specifically 800 to 1,100 psi (5.52 to 7.58 MPa).

In an embodiment, the lignin fraction is hydrotreated directly without use of a diluent. In another embodiment, the lignin fraction may be diluted with a cosolvent as discussed hereinabove, where dilution may provide for lower viscosity and may provide a higher throughput of lignin fraction In an exemplary embodiment, the lignin fraction is diluted with an alcohol, such as methanol. Also in an embodiment, the feed may be diluted to 1 to 50 wt %, specifically 1 to 25 wt %, and more specifically 5 to 15 wt % of the lignin fraction based on the total weight of the lignin fraction and solvent.

In addition, the hydrogenated water-soluble fraction of bio-oil may be reacted (i.e., hydrogenated) in a second hydrogenation step to form alkanes. In an embodiment, a group VII or Group VIII catalyst is used as described above. A useful catalyst for second stage hydrogenation of functional species present in the hydrogenated water-soluble bio-oil may include a hydrocracking catalyst as described above, such as, for example platinum on silica, and in a further embodiment, the catalyst may include as well a dehydration catalyst. Useful dehydration catalysts for this purpose include any strongly acidic species such as, for example, acids such as hydrochloric acid, acidic ion exchange resins (e.g., DOWEX® DR-G8 resin), and metal oxides and salts such as alumina ($Al_2O_3$), zirconium phosphate ($ZrPO_4$), and niobium phosphate ($NbPO_4$). In an embodiment, where the carbon-carbon bond formation reaction is not used, a distribution of hydrocarbon, from $C_1$ to $C_6$ or $C_7$, may be obtained. In another embodiment, where the carbon-carbon bond formation reaction is used, a relatively higher distribution of hydrocarbons, from $C_5$ to $C_9$, may be obtained.

Thus, in an embodiment, hydrocarbons such as alkanes may be obtained from the hydrogenated water-soluble bio-oil fraction by reacting, in the presence of, a hydrocracking catalyst, at least a portion of hydrogenated water-soluble fraction prepared by hydrogenating the water-soluble fraction of the bio-oil. In a specific embodiment, the reacting in the presence of the hydrocracking catalyst is further carried out in the presence of additional hydrogen; wherein at least a portion of additional hydrogen used in the reacting in the presence of the hydrocracking catalyst may be generated by the reforming of hydrogenated water-soluble fraction of bio-oil.

Desirably, the catalyst is a hydrocracking catalyst as described above, a specific example of which is platinum on silica-alumina ($Pt/SiO_2$—$Al_2O_3$). In another specific embodiment, reacting in the presence of hydrocracking catalyst is further carried out in the presence of an acid as dehydration catalyst. The acid may be any acid provided it is suitable for this purpose, where exemplary acids for this purpose are as described above.

Also in an embodiment, the reacting of the hydrogenated water soluble fraction of bio-oil in the presence of a hydrocracking catalyst is carried out at a temperature of greater than 200° C., and specifically 250 to 275° C., more specifically 255 to 270° C., and at a pressure of 500 to 2,000 psi (3.45 to 13.79 MPa), specifically 600 to 1800 psi (4.14 to 12.41 MPa), and still more specifically 700 to 1,500 psi (4.82 to 10.34 MPa.

In this way, reacting of a hydrogenated water-soluble bio-oil fraction in the presence of a hydrocracking catalyst generates hydrocarbons. In an embodiment, the hydrocarbons comprise $C_{1-6}$ alkanes.

The hydrogenated water soluble fraction of bio oil may further be subject to a carbon-carbon bond forming reaction to increase carbon number in the distribution of carbon species within the hydrogenated water-soluble fraction. This may be accomplished by, in an embodiment, a bond-forming reaction such as an aldol condensation of different carbonyl species (e.g., aldehydes such as furfural, or ketones such as hydroxyacetone) within the water-soluble fraction. An aldol condensation catalyst may be used to effect the bond formation. An exemplary aldol condensation catalyst for this purpose may include a copper-based catalyst. Reactions to produce the higher carbon fractions may be carried out in a batch mode or continuous flow mode, using a packed catalyst bed reactor.

Thus in a further embodiment, prior to reacting of hydrogenated water soluble bio-oil fraction in the presence of the hydrocracking catalyst, all or at least a portion of the hydrogenated water soluble bio-oil fraction may be reacted in the presence of an aldol condensation catalyst. An aldol condensation catalyst on solid support is desirable, where an exemplary aldol condensation catalyst includes a copper on silica-aluminum oxide ($Cu/SiO_2$—$AlO_x$) catalyst. The reacting in the presence of aldol condensation catalyst is carried out in batch mode or continuous flow mode. In this way, where reacting with an aldol condensation catalyst is carried out prior to the reacting in the presence of a hydrocracking catalyst, hydrocarbons comprising $C_{5-9}$ alkanes may be generated.

In an embodiment, the reforming ratio for water-soluble fraction of bio-oil is greater than or equal to about 2.0, specifically greater than or equal to about 2.2, and still more specifically greater than or equal to 2.3. In another embodiment, the hydrogen selectivity of the hydrocracking reaction is greater than or equal to about 60%, specifically greater than or equal to about 65%, and still more specifically greater than or equal to about 68%.

Hydrocracking can provide different cuts of hydrocarbon fractions from the lignin fraction, ranging from more chemically complex diesel fractions, to intermediate fractions, to light naphtha fractions with progressively less aromatic content an lower carbon content for the hydrocarbons. The catalyst activity and loading, and other conditions (temperature, pressure, flow rate, amount of hydrogen taken up, LHSV, and the like) may be selected such that the product is enriched in a particular fraction as desired.

Thus, in an embodiment, a method of generating liquid fuel from bio-oil, comprises hydrocracking a water-insoluble lignin fraction of bio-oil with hydrogen and a hydrocracking catalyst, wherein the hydrogen is generated by reforming a water-soluble fraction of bio-oil by aqueous-phase reforming (APR) with a reforming catalyst. In an embodiment, liquid fuel is generated by the hydrocracking.

In another embodiment, a method of generating $C_{5-25}$ alkanes from bio-oil, comprises hydrotreating a water-insoluble lignin fraction of bio-oil with hydrogen in the presence of a hydrotreating catalyst, wherein the hydrogen is generated by hydrogenating a water-soluble fraction of the bio-oil with hydrogen in the presence of a hydrogenation catalyst, and reforming the hydrogenated water-soluble fraction of the bio-oil by aqueous-phase reforming in the presence of a reforming catalyst, wherein the amount of hydrogen generated by aqueous-phase reforming is greater than that consumed by the hydrogenating and hydrotreating, and wherein $C_{5-25}$ alkanes is generated by the hydrotreating.

In another embodiment, a method of forming hydrogen and liquid fuel from bio-oil comprises extracting bio-oil with water to form a water-soluble fraction and a lignin fraction, hydrogenating the water-soluble fraction with hydrogen and a hydrogenation catalyst, reforming the water-soluble fraction by aqueous-phase reforming (APR) with a reforming catalyst, and hydrocracking the lignin fraction using hydrogen and a hydrocracking catalyst. In an embodiment, hydrogen is generated by the reforming where the amount of hydrogen generated is greater than that consumed by the hydrogenating and hydrocracking, and liquid fuel is generated by the hydrocracking.

In another embodiment, a method of generating a chemical fraction from a bio-oil, comprises: hydrogenating the water soluble fraction in a first hydrogenation in the presence of a first hydrogenation catalyst to form a first hydrogenated product, hydrogenating at least a portion of the first hydrogenated product in the presence of a second hydrogenation catalyst to form a second hydrogenated product, and reforming a portion of the first hydrogenation product by aqueous-phase reforming in the presence of a reforming catalyst; wherein hydrogen is generated by the reforming, at least a portion of the hydrogen generated by reforming is used the first hydrogenation, the second hydrogenation, or both the first and second hydrogenations, and wherein the chemical fraction comprises alcohols, diols, polyols, furan derivatives, or a combination comprising at least one of the foregoing.

In another embodiment, a method of forming hydrocarbons from bio-oil, comprises: extracting bio-oil with water to obtain a water-soluble fraction and a lignin fraction, hydrogenating the water-soluble fraction with hydrogen in the presence of a hydrogenation catalyst, reforming a portion of the water-soluble fraction by aqueous-phase reforming (APR) in the presence of a reforming catalyst, optionally reacting, in the presence of an aldol condensation catalyst, a portion of hydrogenated water soluble fraction prepared by hydrogenating the water-soluble fraction of the bio-oil, and reacting, in the presence of hydrocracking catalyst, a portion of hydrogenated water soluble fraction prepared by hydrogenating the water-soluble fraction of the bio-oil, wherein hydrogen is generated by the reforming, and at least a portion of the hydrogen generated by the reforming is used in the hydrogenating, the reacting in the presence of hydrocracking catalyst, or both the hydrogenating and the reacting in the presence of hydrocracking catalyst; and wherein hydrocarbons are generated by the reacting in the presence of the hydrocracking catalyst, and wherein when reacting in the presence of an aldol condensation is carried out, hydrocarbons comprising $C_{5-9}$ alkanes are generated, or wherein when reacting in the presence of an aldol condensation is not carried out, hydrocarbons comprising $C_{1-6}$ alkanes are generated.

In a further embodiment, the method of forming hydrocarbons from bio-oil comprises hydrocracking the lignin fraction with hydrogen in the presence of a hydrocracking catalyst. At least a portion of the hydrogen generated by the reforming is used in the hydrocracking.

To illustrate this process, in an exemplary embodiment, the water-insoluble bio-oil (lignin fraction) is subjected to hydrocracking in a tube reactor. Hydrogen from APR of the water-soluble fraction is used in the subsequent hydrogenation of the WIBO to break down the WIBO into a low viscosity liquid comprised of a mixture of low molecular weight (e.g. gasoline range molecular weight) compounds, which can be used as fuel. Excess hydrogen is generated in the APR, and may also be collected and used as fuel.

The bio-oil is thus separated by extraction into two fractions, water-soluble and water insoluble. The water-soluble fraction only is then subjected to a two-stage catalytic process to generate hydrogen, polyols, and/or other chemicals. The lignin fraction is then reacted with the hydrogen generated from the water-soluble fraction and converted into gasoline and diesel range compounds. An embodiment of this method of conversion of bio-oils to fuels and chemicals is shown in FIG. 1 (FIG. 1).

In FIG. 1, bio-oil and water (100) are introduced into a liquid-liquid extractor 101 and separated into water-soluble bio-oil fraction in water 102, and water insoluble bio-oil fraction 103. The water-soluble bio-oil fraction 102 is then introduced into a high-pressure reactor and batch hydrogenated using a Ru/C catalyst 110.

In a subsequent step A, the hydrogenated water-soluble bio-oil fraction is then subject to aqueous-phase reforming 120 using $Pt/Al_2O_3$ as the reforming catalyst. A gaseous fraction is generated by the reforming reaction, primarily including carbon dioxide 123 and hydrogen (121, 122). An aqueous effluent is also obtained, which may be recycled into the aqueous-phase reforming reaction depending on the catalytic efficiency of the APR cycle, or which may be disposed of as appropriate. In an embodiment, at least a portion of hydrogen (121) generated from the APR step 120 is separated from the gaseous fraction and stored for use as a fuel.

In an alternate pathway B, the hydrogenated intermediate from the batch hydrogenation step 110 may be optionally subject to a C—C bond formation step 125. The C—C bond formation step may be accomplished by, for example, a batch process or a continuous flow process in which the hydrogenated intermediate from the batch hydrogenation 110 is passed through a catalyst bed reactor. An exemplary catalyst for the C—C bond forming reaction includes copper magnesium alumina catalysts such as $CuMg_{10}$—$AlO_x$ where x is an integer. The inclusion of the C—C bond forming step can increase the chain length of the hydrogenated intermediate products, from a distribution of carbon chain lengths of up to about six carbon atoms, to carbon chain lengths of up to at least nine or greater.

The hydrogenated intermediate from the batch hydrogenation step 110, either before or after the C—C bond formation step 125, or without being subject to the batch hydrogenation step 125, is then further hydrogenated in the presence of a hydrocracking catalyst such as a platinum-silica-alumina, e.g., $Pt/SiO_2$—$Al_2O_3$ in a further hydrogenation step 126.

In an embodiment, hydrogenation 126, carried out using hydrogenated intermediate from the batch hydrogenation step 110, without being subject to the C—C bond formation step 125, can produce hydrocarbons. In a specific embodiment, alkanes 127 having a carbon chain distribution of $C_1$ to $C_6$ (i.e., $C_{1-6}$ alkanes) can be produced.

In another embodiment, hydrogenation 126, carried out using hydrogenated intermediate from the batch hydrogenation step 110 subjected to the C—C bond formation step 125, can produce hydrocarbons having a higher carbon chain length than would be obtained without the C—C bond formation step 125. In another specific embodiment, alkanes 127 having a carbon chain distribution of $C_5$ to $C_9$ (i.e., $C_{5-9}$ alkanes) can be produced. In an embodiment, the alkanes, where of a chain length of $C_4$ or greater, can include straight chain alkanes, branched chain alkanes, and the like, or combinations of these.

In another alternative pathway C, the hydrogenated intermediate from the batch hydrogenation step 110 may be subject to a second, further batch hydrogenation step 128 to produce polyols 129. The second batch hydrogenation step 128 may be carried out in the same manner, and using the same conditions, as the batch hydrogenation step 110.

In an embodiment, the polyols 129 include polyols of greater than 3 carbon atoms. In a specific embodiment, polyols 129 may include, for example, butane polyols such as butanediols, butanetriols, butanetetrols, and the like; pentanediols, pentanetriols, pentanetetrols, pentanepentols, and the like; hexanediols, hexanetriols, hexanetetrols, hexanepentols, sorbitol, and the like; combinations of these, and the like. It will be understood that the aforementioned polyols are exemplary and should not be considered as limited thereto.

Separately, the water insoluble bio-oil 103 is subject to a hydrocracking step 130. The hydrocracking step 130 may run prior to, concurrent with, or subsequent to the APR step 120. In the hydrocracking step 130, the water insoluble bio-oil may be mixed with a solvent to decrease viscosity and improve processability of the viscous water-insoluble bio-oil fraction. Solvents may include, but are not limited to, for example, water; an alcohol including alkyl alcohols such as methanol, ethanol, isopropanol, n-butanol, or the like; ethers including cyclic water-miscible ethers such as tetrahydrofuran, dioxane, substituted dioxanes, dioxolane, and the like; carbonate solvents such as ethylene carbonate, propylene carbonate, trimethylenecarbonate, dimethyl carbonate, diethyl carbonate, dipropyl carbonate, and the like; ionic solvents including salts of cations including alkali metal cations, alkyl-substituted imidazolium, 1-alkylpyridinium, N-methyl-N-alkylpyrrolidinium, ammonium and $C_{1-20}$ substituted ammonium, paired with anions such as halides, tetrafluoborate, hexafluorophosphate, bistriflimide, triflate, tosylates, formate, alkylsulfates, alkylphosphates, and glycolates, wherein exemplary ionic liquids include 1-butyl-3-methylimidazolium hexafluorophosphate, 1-butyl-3-methylimidazolium tetrafluoroborate, and cesium formate; and mixtures comprising at least one of the foregoing solvents.

After hydrocracking of the WIBO, a liquid fuel 131 is generated which, depending on the conditions used, may include gasoline-range hydrocarbon fractions, diesel-range hydrocarbon fractions, or a combination thereof, and which may be subsequently separated and refined as desired by fractional distillation and refining. The solvent can be recycled 132 to mix with further water insoluble bio-oil fractions 103 to facilitate processing. An effluent 133, which includes high molecular weight by-products and/or aqueous residues of the hydrocracking process, are removed from the process and disposed of as appropriate.

In an embodiment, at least a portion of hydrogen (122) generated from the APR step 120 may be used in one or more of the subprocesses of batch hydrogenation (also referred to herein as hydrotreating) 120 or hydrocracking of WIBO 130 as the source of hydrogen in these steps. The total amount of hydrogen generated by the APR step 120 is typically greater than the amount of hydrogen required for either the batch hydrogenation 120 or the hydrocracking of WIBO 130. Batch hydrogenation step 110 may use hydrogen from an external source, and/or hydrogen 122 generated by APR step 120. In an embodiment, a portion of the total amount of hydrogen 122 generated in the APR step 120 is used in batch hydrogenation step 110. In another embodiment, the hydrogen used in the hydrogenation step 110 is generated by aqueous-phase reforming of a water-soluble fraction of bio-oil. In another embodiment, hydrogenation step 126 in alternative pathway B, and/or hydrogenation step 128 in alternative pathway C, may be accomplished using hydrogen introduced from an independent source, or using hydrogen (121) generated from the APR reaction 120 in pathway A.

In an embodiment, at least a portion of hydrogen (122) generated from the APR step 120 may be used in one or more of the subprocesses of batch hydrogenation 120 or hydrocracking of WIBO 130 as the source of hydrogen in these steps. Hydrocracking step 130 may use hydrogen from an external source, and/or hydrogen 122 generated by APR step 120. In an embodiment, a portion of the total amount of hydrogen 122 generated in the APR is used in batch hydrogenation step 110. In another embodiment, the hydrogen used in the hydrogenation step 110 is generated by aqueous-phase reforming of a water-soluble fraction of bio-oil.

It will be appreciated that the above-described embodiments are illustrative of the process and are not to be considered as limited thereto. For example, additional steps may be included in the above-described methods, or the order of steps of the methods embodied herein may be arranged as appropriate to other exemplary embodiments within the scope of the invention described herein.

The method is further illustrated by the following non-limiting examples.

EXAMPLE 1

Aqueous Extraction of Bio-Oil

Bio-oil (100 lb.; 45.5 Kg) was mixed thoroughly with an excess of water (400 lb.; 182 Kg) (weight ratio of bio-oil to water=0.25:1) in a liquid-liquid extraction (LLE) process. The mixture was centrifuged for 30 minutes at 10,000 rpm using a Marathon 21000 centrifuge (available from Fisher Scientific) to cause the aqueous and non-aqueous phases to separate. The aqueous layer was separated from the lower, water-insoluble lignin fraction layer by decanting, and the aqueous layer analyzed to assay the content of the constituents by gas chromatography-mass spectrometry (GC-MS) or gas chromatography-flame ionization detection (GC-FID). About 30 to 40% by weight of the carbon species extracted into the aqueous layer were analyzable by GC-MS. The major identifiable compounds present in the water-soluble fraction of the bio-oil included acetic acid, hydroxyacetone, furfural, guaiacols, and levoglucosan. Further analysis of the water-soluble fraction using high performance liquid chromatography (HPLC) showed the presence of sugars such as glucose and xylose.

Figure 2:
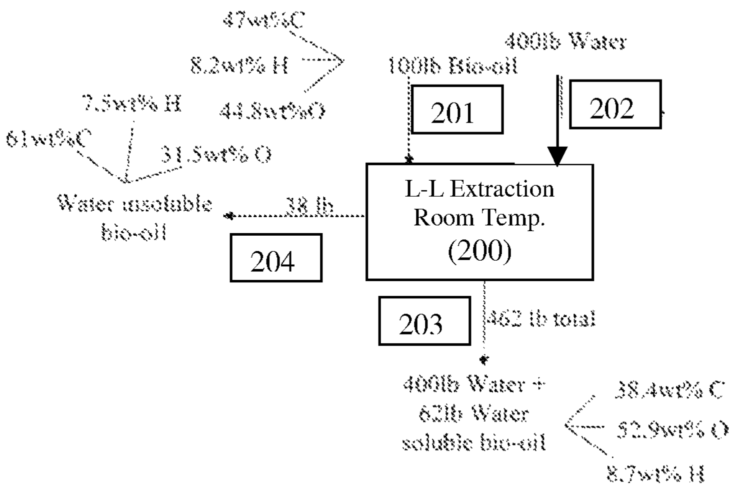
FIG. 2 illustrates an exemplary process for liquid extraction of bio-oil with water.

The mass balance for the aqueous extraction is shown schematically in FIG. 2. As seen in FIG. 2, the bio-oil 201 (100 lb; 45.5 Kg) with an initial mass distribution of about 47 wt % C, 8.2 wt % H, and 44.8 wt % O prior to extraction, was combined with the 400 lb (about 182 Kg) water 202 to provide the above-described proportion of bio-oil and water in the room temperature liquid-liquid extraction 200. The water-soluble fraction (203), with a combined mass of 462 lb (about 210 Kg total mass; including 62 Kg water-soluble bio-oil fraction) had an elemental composition of 34.8 wt % C, 52.9 wt % O, and 8.7 wt % H (based on water-soluble analyte composition and excluding elemental contributions from water). In addition, the water-insoluble fraction of bio-oil 204 (38 lb; 17.3 Kg) has an elemental composition of 61 wt % C, 7.5 wt % H, and 31.5 wt % O. Thus, about 60 wt % of the bio-oil components including water-soluble components and water (excluding any water insoluble species present in the crude bio-oil) is extracted into the water phase, which translates to extraction into the water phase of about 50% of the total energy content of the original pre-extraction bio-oil (based on the wt % C and H in the water-soluble bio-oil extracts). Thus, by extracting with water, carbon present in the form of sugars, sugar alcohols, and the like, which are present in the crude bio-oil (though undetectable by GC-MS due to low volatility), can be rapidly and efficiently separated from non-reformable species in order to more cleanly and readily process and efficiently convert these components to recover the chemical energy present in the water-soluble fractions.

EXAMPLE 2

Hydrogenation of Water-Soluble Fraction of Bio-Oil

The water-soluble fraction of the bio-oil, comprising about 13.5% by weight aqueous-soluble bio-oil components, was subsequently hydrogenated under mild hydrogenation conditions in a Parr batch reactor, in the presence of Ru/C (5 wt % Ru loading; available from Strem Chemicals) as the hydrogenation catalyst, and using mild hydrogenation conditions at about 175° C. and about 1,000 psi (about 6.9 MPa) total pressure. The feed and products were analyzed for composition by GC-MS, GC-FID and HPLC using the conditions described hereinabove. The major components in the feed were identified as acetic acid, hydroxy acetone, furfural, various guaiacols and levoglucosan and sugars. Only about 25 to 35% by weight of the carbon in the feed was identifiable by GC-MS. As hydrogen was consumed during the reaction, additional hydrogen was supplied to the reactor during the course of the hydrogenation to maintain a constant pressure in the reactor. Hydrogenation of the water-soluble fraction of bio-oil was carried out for a time duration of about 1 h. The resulting products were again analyzed by GC-MS. Major products post-hydrogenation were identified as ethylene glycol, propylene glycol, 1,2-butanediol, γ-butyrolactone, tetrahydrofurfuryl alcohol (THFA), and 1,2-cyclohexanediol. Table 2 shows the concentrations of the various reactants and products identified in the hydrogenated water-soluble fraction as a function of reaction time.

TABLE 2[a]

| | Concentration (mmol C/L) | | | | | |
|---|---|---|---|---|---|---|
| Reaction time (min) | Hydroxy Acetone | Ethylene Glycol | Propylene Glycol | Butanediols | THFA | Guaiacols |
| 0 | 140.4 | 60.8 | 0.0 | 0.0 | 0.0 | 11.6 |
| 30 | 186.6 | 63.5 | 177.3 | 62.5 | 44.4 | 14.5 |
| 60 | 204.2 | 0.0 | 203.3 | 109.1 | 54.9 | 0.0 |

[a]Hydrogenation of water-soluble fraction of bio-oil at 175° C.; Feed: 80 g of ~13.5 wt % WSBO in water, total pressure: 1,000 psi (6.9 MPa); Catalyst: 3.285 g Ru/C (wet).

About 40 to about 45% by weight of the carbon after batch hydrogenation was detectable by GC-MS, for a net gain of 15-20% by weight of volatile carbon species. HPLC analysis of the batch hydrogenation product showed presence of sorbitol which is a glucose hydrogenation product.

EXAMPLE 3

Aqueous-Phase Reforming (APR) of a Hydrogenated Water-Soluble Fraction of Bio-Oil The hydrogenated water-soluble fraction obtained as the product of batch hydrogenation in Example 2 was diluted to about 5% by weight solute and subjected to reforming in a continuous reactor in the presence of 1 wt % Pt on alumina (available from UOP Corp.) as the reforming catalyst. The reforming was carried out on the product of the batch hydrogenation (i.e., the water-soluble fraction) at temperature of 265° C. and at a pressure of about 800 psi (about 5.5 MPa). LHSV for the process was 0.73 grams of liquid fed per gram of catalyst per hour (g/g-h).

Figure 3:
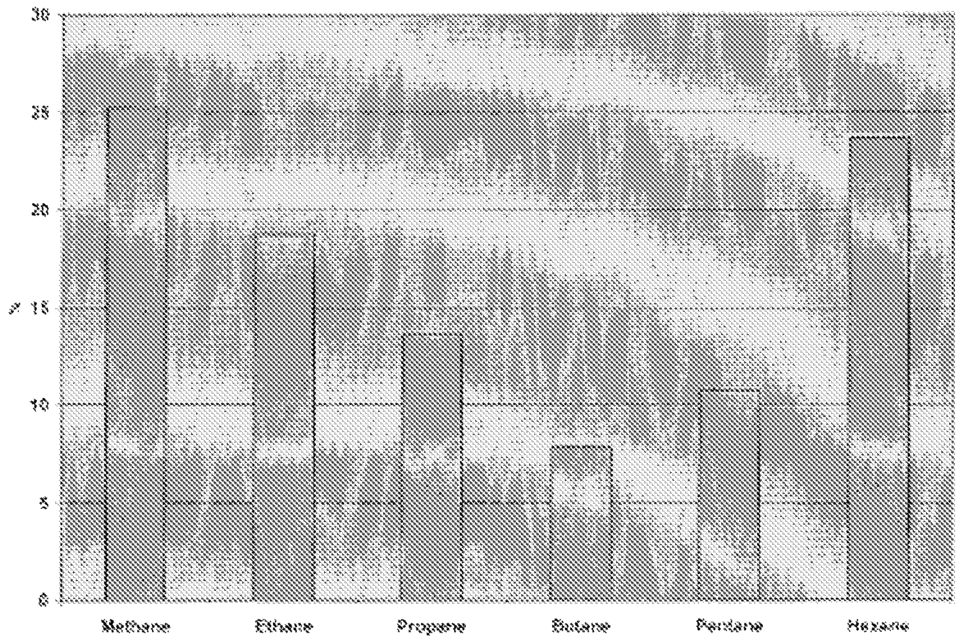
FIG. 3 illustrates a plot of percent alkane fraction (based on total alkane content) versus alkane type, for the products of an exemplary APR reaction with a water-soluble fraction of bio-oil.

From the elemental composition of WSBO as seen in FIG. 2, the representative empirical molecular formula of the reformed components can be written as $C_2H_{6.2}O_{2.05}$. Thus, the balanced reforming reaction taking place is:

$$C_2H_{6.2}O_{2.05}+1.95\ H_2O \rightarrow 5.05\ H_2+2\ CO_2\ (\text{+low MW alkanes}),$$

and hence the reforming ratio for WSBO is 2.525. The gas (product) phase contained $C_{1-6}$ alkanes, $CO_2$ and $H_2$. The combined carbon selectivity for all alkanes generated was 20%, whereas the carbon selectivity of $CO_2$ was 80%. Selectivities of the individual alkanes (based on the total of alkanes generated) are shown in FIG. 3. For the APR reaction under these conditions, a hydrogen selectivity of 70% was observed. Overall carbon conversion to gas phase products ($CO_2$, $C_{1-6}$ alkanes) was 21%.

COMPARATIVE EXAMPLE

Aqueous Phase Reforming of Non-Hydrogenated Water-Soluble Fraction of Bio-Oil Reforming of a water-soluble fraction of bio-oil (diluted to about 5% by weight solute) was carried out as in Example 3 at about 260° C. and about 800 psi (about 5.5 MPa) of total pressure, where the water-soluble bio-oil fraction used in this comparative example was prepared as described in Example 1, and used directly in the reforming reaction without first hydrogenating the water-soluble fraction of bio-oil (as in Example 2). An LHSV of about 0.73 was used for the process. Gas products evolved were found to contain $C_{1-6}$ alkanes, $H_2$ and $CO_2$ by GC-MS. After catalyst was on stream for 10 h., carbon selectivities to $CO_2$ and alkanes were found to be 30% and 70% respectively. Hydrogen selectivity of 36% was observed. With catalyst on stream for more than 20 h. $CO_2$ and alkane selectivities were found to be 12% and 88%, respectively. A low hydrogen selectivity of 24% was obtained, indicating catalyst deactivation. Thus, low hydrogen selectivities of 36% (at 10 h.) and 24% (at 20 h.) are obtained without prior hydrogenation compared to the hydrogen selectivity of an APR reaction carried out with a hydrogenated aqueous fraction of bio-oil (i.e., Example 3 which shows 70% hydrogen selectivity). Also, catalyst deactivation was observed when the non-hydrogenated aqueous phase bio-oil is passed over it (5% by weight solute). The mild hydrogenation of the water-soluble fraction of bio-oil is hence necessary to achieve high hydrogen selectivity and to increase catalyst life.

EXAMPLE 5

Pre-Treatment of Water-Soluble Fraction Before Hydrogenating and Aqueous-Phase Reforming About 100 ml of 13.5 wt % solute water-soluble fraction obtained from aqueous extraction of bio-oil in Example 1 was passed through a column packed with DOWEX® DR-G8 resin (available from Dow), which is an ion-exchange resin known to remove acids and acid salts. In the example, the column (2 cm diameter) was packed to a bed height of about 4 cm, and the water-soluble fraction was passed though the bed at a rate of about 3 ml/min. The aqueous phase thus obtained was then subject to mild hydrogenation followed by APR, each using the same reaction conditions as in previous Example 2 without pre-treatment with the ion-exchange resin. The gas (product) phase from the reforming contained $C_{1-6}$ alkanes, $CO_2$ and $H_2$. The combined carbon selectivity for all alkanes generated was about 20%, whereas the carbon selectivity of $CO_2$ was 80%. For the APR reaction under these conditions, a hydrogen selectivity of greater than 80% was observed. The total carbon conversion to gas phase was 46%.

EXAMPLE 6

Hydrocracking

The lignin fraction of bio-oil (WIBO) is mixed with alcohol (n-butanol) in a ratio of 1:21.5 in proportion by weight of WIBO to solvent, to make it fluid. This feed is then subjected a hydrocracking reaction in the continuous reactor. The reactor used is a 0.25 inch diameter steel tube reactor packed with a hydrocracking catalyst of 4 wt % Pt on silica-alumina catalyst (UOP), made by the wet impregnation method. The catalyst is supported by glass wool on both ends of the reactor. The feed is pumped into the reactor at high pressure (about 2,000 psi; about 13.8 MPa) with a JASCO PU-980 HPLC pump. Hydrogen is also supplied through the bottom of the tube furnace. A backpressure regulator is used to maintain the system at high pressure, and the reactor tubing is heated by a Lindberg furnace. The product gas coming from the reactor is analyzed by two HP 5890 online gas chromatographs. Liquid product is analyzed using Shimadzu GC-MS system.

A hydrocarbon fraction of the bio-oil (i.e., the WIBO) is in this way generated by the hydrocracking reaction. The obtained hydrocarbon fraction from the hydrocracking includes different components of a light gasoline fraction ($C_{5-10}$ hydrocarbons).

EXAMPLE 7

Production of Alkanes from the Aqueous Fraction of Bio-Oil

A fraction of water-soluble bio-oil (WSBO), after fractionation, was subject to a two-stage hydrogenation (e.g., as described in FIG. 1, alternative pathway B). The WSBO feeds used had weight-hourly space velocities (WHSV, in $h^{-1}$) of 0.96 (WSBO-D) and 0.2 (WSBO-E). In addition, the effects of additional hydrogen ($H_2$) included in the hydrogenation, and/or acidic dehydration catalyst (HCl), were also evaluated.

The first stage of hydrogenation was performed according to the process described in Example 2, above, except that the WSBO feeds contain 1.5-2 wt % carbon and are prepared by hydrogenation of an aqueous fraction of bio-oil at 175° C. and 1,000 psi (6.89 MPa) using a 5 wt % Ru/C catalyst for 3 h. Production of alkanes from the hydrogenated WSBO fractions and from sorbitol was carried out at 260° C. and 750 psi (5.17 MPa) with a 4 wt % $Pt/SiO_2$—$Al_2O_3$ catalyst. The results for the hydrogenations are summarized in Table 3, below. The feed and products were analyzed for composition by GC-MS, GC-FID and HPLC using the conditions described hereinabove.

sorbitol (Ex. 7-7). From these data, it can be seen that the highest selectivity for higher alkanes ($C_6$) is obtained for the higher space velocity sample (Ex. 7-1).

Figure 5:
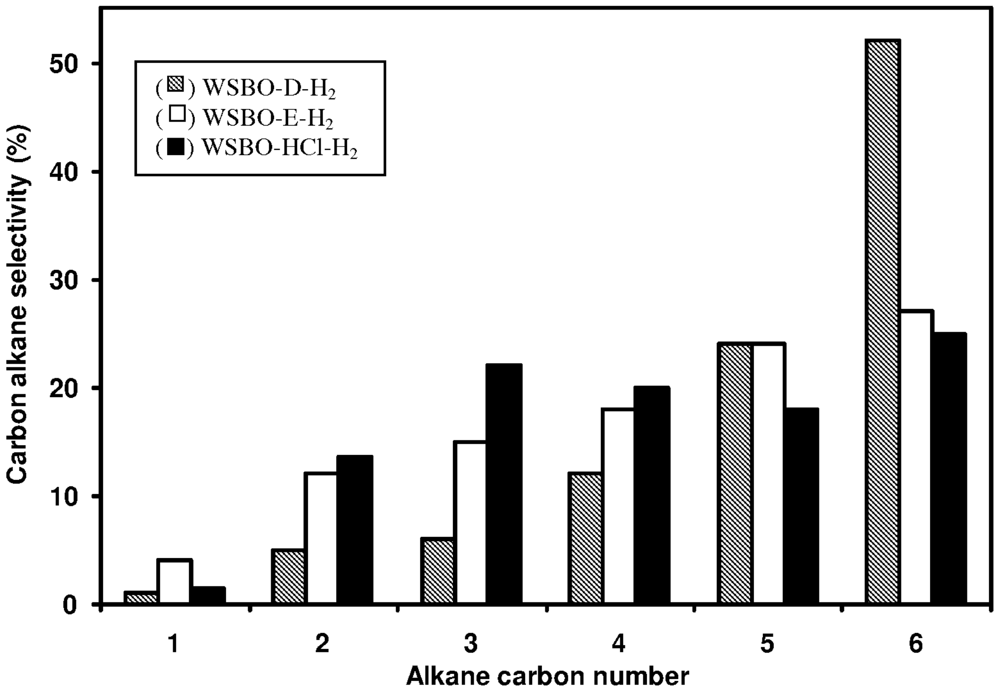
FIG. 5 illustrates a plot of carbon alkane selectivity (%) for different alkane carbon numbers, for an exemplary second stage hydrogenation, with additional hydrogen included.

FIG. 5 shows the alkane distribution for the liquid phase dehydration/hydrogenation of WSBO and 5 wt % sorbitol solution at 260° C. and 750 psi with 4 wt % $Pt/SiO_2$—$Al_2O_3$ catalyst, for the examples using additional hydrogen added to the feed. In the figure, the feed and reaction key (see table 5) are as follows (see table 5): (■) WSBO-D-$H_2$, (□) WSBO-E-$H_2$, (■) WSBO-HCl-$H_2$. From these data, it can be seen that the highest selectivity for higher alkanes ($C_6$) is obtained for the higher space velocity sample (Ex. 7-3).

EXAMPLE 8

Production of Alkanes, Monohydric Alcohols, Diols and Polyols from the Aqueous Fraction of the Bio-Oil by 2-Stage Hydrogenation A fraction of water soluble bio-oil (WSBO), after fractionation, was subject to a two (2) stage hydrogenation (e.g., as described in FIG. 1, alternative pathway C).

The first stage of hydrogenation was performed according to the process described in Example 7, except that the feed was a solution of about 13 wt % WSBO in water, and the hydrogenation was carried out at 125° C. and 1,000 psi (6.89 bar) using a 5 wt % Ru/C catalyst for 3 h, at a flow rate of 0.08 ml/min.

The second stage hydrogenation for production of polyols from the hydrogenated WSBO fractions was carried out at 220 to 275° C. and 750 or 1445 psi (5.17 MPa or 9.96 MPa) with a 5 wt % Ru/C or Pt/C catalyst.

TABLE 3

| | Run | Feed | WHSV[a] ($h^{-1}$) | Hours Catalyst on Stream | Alkane Selectivity[b] (%) | % Carbon in Gas Phase Effluent[c] | % Carbon in Liquid Phase Effluent |
|---|---|---|---|---|---|---|---|
| Ex. 7-1 | WSBO-D | WSBO | 0.96 | 48 | 45 | 35[d] | 38 |
| Ex. 7-2 | WSBO-E | WSBO | 0.20 | 25 | 42 | 40-50 | 43 |
| Ex. 7-3 | WSBO-D-$H_2$ | WSBO + $H_2$ | 0.96 | 80 | 77 | 18 | 59 |
| Ex. 7-4 | WSBO-E-$H_2$ | WSBO + $H_2$ | 0.20 | 55 | 85 | 56 | 37 |
| Ex. 7-5 | WSBO-E-HCl | WSBO + HCl | 0.20 | 200 | 55-60 | 40-45 | 47 |
| Ex. 7-6 | WSBO-E-HCl—$H_2$ | WSBO + HCl + $H_2$ | 0.20 | 215 | 97 | 55-60 | 32 |
| Ex. 7-7 | Sorbitol | Sorbitol | 0.96 | 24 | 42 | 72 | 19 |

[a]WHSV = flow rate of the aqueous fraction of bio-oil (in g-$h^{-1}$) divided by grams of catalyst in the reactor.
[b]Alkane selectivity = (total moles of carbon atoms in alkane products)/(total moles of carbon atoms in the feed) × 100.
[c]Gas phase contains C1 to C6 alkanes and $CO_2$.
[d]Decreases to 30% with the catalyst on stream for 60 h.

As seen in the above table 3, for WSBO having additional hydrogen included in the WSBO feeds has a higher overall alkane selectivity, as seen in a comparison of additionally hydrogenated Ex. 7-3 (77%) and 7-4 (85%) with Ex. 7-1 (45%) and 7-2 (42%), respectively. In addition, low space velocity speeds (Exs. 7-2 and 7-4) show a higher alkane selectivity than high space velocity feeds (Exs. 7-1, 7-3). Inclusion of a dehydration catalyst (Ex. 7-5) increases the alkane selectivity, where the greatest alkane selectivity is obtained with added HCl and hydrogen in the feed, and a low space velocity (Ex. 7-6). However, the highest amount of liquid phase carbon is obtained with a high space velocity and added hydrogen (Ex. 7-3).

Figure 4:
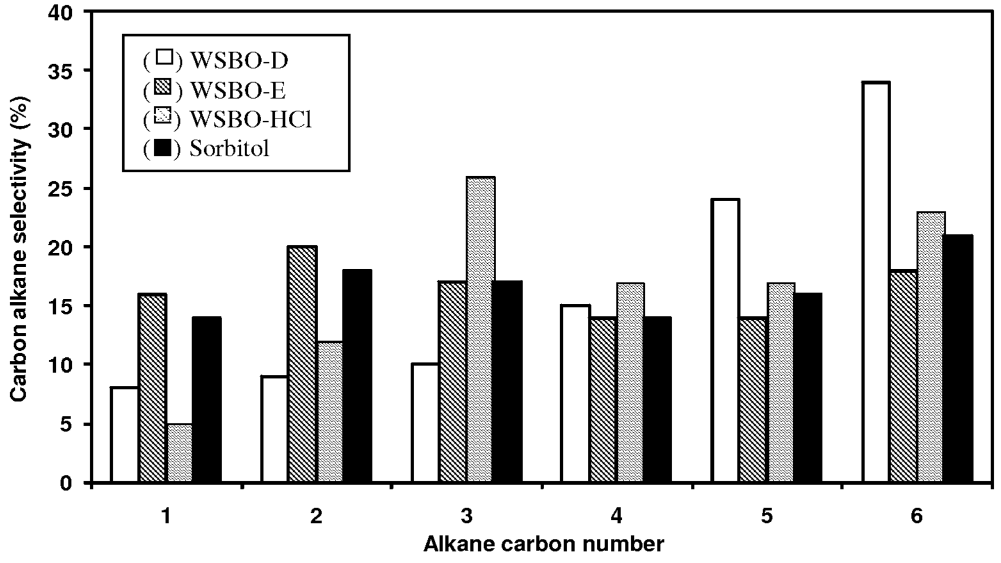
FIG. 4 illustrates a plot of carbon alkane selectivity (%) for different alkane carbon numbers, for an exemplary second stage hydrogenation.

FIG. 4 shows the alkane distribution obtained in Example 7 for the liquid phase dehydration/hydrogenation of WSBO and 5 wt % sorbitol solution at 260° C. and 750 psi with 4 wt % $Pt/SiO_2$—$Al_2O_3$ catalyst. In the figure, the feed and reaction key are as follows (see table 5): (□) WSBO-D (Ex. 7-1), (■) WSBO-E (Ex. 7-2), (▧) WSBO-HCl (Ex. 7-6), and (■)

Table 4 below shows the data obtained for Examples 8-1 to 8-10. The feed and products were analyzed for composition by GC-MS, GC-FID and HPLC using the conditions described hereinabove. Where alcohols are discussed below, the alcohols include methanol, ethanol, propanol, butanol, pentanol, cyclopentanol, cyclopentanol, 3-methyl, hexanol, cyclohexanol, 3-methylcyclohexanol, 4-methylcyclohexanol, THF-alcohol, and tetrahydro-2H-pyran-2-methanol; where diols are discussed, the diols include ethylene glycol (EG), propylene glycol (PG), butanediol, cyclohexanediol, pentanediol, and hexanediol; where polyols are discussed, the polyols include glycerol, sorbitol, butanetriol, and hexanetriol; where furan derivatives are discussed, the furan derivatives include methyltetrahydrofurans, dimethlyltetrahydrofurans, and lactones such as γ-butyrolactone, valerolactone, and hydroxymethyl-butyrolactone; and where alkanes are discussed, the alkanes include $C_1$-$C_6$ alkanes such as methane, ethane, propane, butane, isobutane, pentane, isopentane, neopentane, hexane, 2-methylpentane, 2,2-dimethyl butane, 2,3-dimethylbutane, and the like.

TABLE 4

| | Cat. | Temp. (° C.) | Pressure (psi) | Alcohol mmol-C/L | Diol mmol-C/L | Polyol mmol-C/L | Furan derivatives mmol-C/L | Acid mmol-C/L | Sugar mmol-C/L | C. in liquid mmol-C/L |
|---|---|---|---|---|---|---|---|---|---|---|
| Ex. 8-1 | Pt/C | 220 | 750 | 392 | 837 | 576 | 181 | 121 | 7 | 2114 |
| Ex. 8-2 | Ru/C | 220 | 750 | 345 | 649 | 254 | 197 | 171 | 4 | 1620 |
| Ex. 8-3 | Pt/C | 250 | 750 | 752 | 712 | 16 | 179 | 59 | 4 | 1723 |
| Ex. 8-4 | Ru/C | 250 | 750 | 553 | 183 | 53 | 132 | 46 | 0 | 967 |
| Ex. 8-5 | Pt/C | 220 | 1445 | 294 | 963 | 673 | 241 | 133 | 10 | 2315 |
| Ex. 8-6 | Pt/C | 250 | 1445 | 463 | 1196 | 114 | 217 | 105 | 7 | 2102 |
| Ex. 8-7 | Pt/C | 275 | 1445 | 643 | 685 | 29 | 199 | 57 | 4 | 1616 |
| Ex. 8-8 | Ru/C | 125 | — | 218 | 831 | 417 | 183 | 203 | 43 | 1896 |

| | Alkane mmol-C/L | Total C. Prod. mmol-C/L | C. Lost mmol-C/L | % C in gas | Conversion, % | C in feed (mmol-C/L) | C. in liquid (mmol-C/L) | % C. ident. (mmol-C/L) |
|---|---|---|---|---|---|---|---|---|
| Ex. 8-1 | 496 | 2610 | 7 | 20 | 92 | 4006 | 3224 | 65 |
| Ex. 8-2 | 614 | 2233 | 20 | 35 | 91 | 4074 | 2638 | 55 |
| Ex. 8-3 | 847 | 2570 | 7 | 28 | 96 | 4006 | 2881 | 64 |
| Ex. 8-4 | 2657 | 3624 | 0 | 65 | 98 | 4074 | 1417 | 89 |
| Ex. 8-5 | 109 | 2424 | 7 | 10 | 91 | 4006 | 3616 | 61 |
| Ex. 8-6 | 263 | 2366 | 8 | 15 | 93 | 4006 | 3405 | 59 |
| Ex. 8-7 | 308 | 1925 | 28 | 36 | 97 | 4006 | 2570 | 48 |
| Ex. 8-8 | 472 | 2368 | −5 | 7 | 70 | 3879 | 3590 | 61 |

As seen in the data in table 4, for the conditions shown, the greatest conversion of alcohols is obtained with Pt/C catalyst at a temperature of 250° C., at 750 psi (Ex. 8-3). The highest conversion to diol (e.g., ethylene glycol, propylene glycol) is obtained with Pt/C catalyst at a temperature of 250° C., at 1445 psi (Ex. 8-6), while polyol conversion is maximized with Pt/C catalyst at a temperature of 220° C., at 1445 psi (Ex. 8-5). In this way, it can be seen that adjustment of pressure and temperature, with a Pt/C catalyst, can provide control over the distribution of hydroxy compound obtained.

Table 5 shows the product distribution according to carbon number, for the above reaction.

TABLE 5

| | Cat. | Temp. (° C.) | Pressure (psi) | % C in Product (by # of carbons) $C_1$ | $C_2$ | $C_3$ | $C_4$ | $C_5$ | $C_6$ | $C_7$ |
|---|---|---|---|---|---|---|---|---|---|---|
| Ex. 8-1 | Pt/C | 220 | 750 | 16 | 18 | 14 | 19 | 9 | 22 | 2 |
| Ex. 8-2 | Ru/C | 220 | 750 | 13 | 17 | 12 | 13 | 7 | 36 | 1 |

TABLE 5-continued

| | Cat. | Temp. (° C.) | Pressure (psi) | % C in Product (by # of carbons) $C_1$ | $C_2$ | $C_3$ | $C_4$ | $C_5$ | $C_6$ | $C_7$ |
|---|---|---|---|---|---|---|---|---|---|---|
| Ex. 8-3 | Pt/C | 250 | 750 | 31 | 23 | 15 | 12 | 8 | 10 | 1 |
| Ex. 8-4 | Ru/C | 250 | 750 | 25 | 15 | 13 | 17 | 11 | 17 | 2 |
| Ex. 8-5 | Pt/C | 220 | 1445 | 5 | 19 | 12 | 17 | 7 | 38 | 2 |
| Ex. 8-6 | Pt/C | 250 | 1445 | 11 | 4 | 4 | 32 | 16 | 30 | 4 |
| Ex. 8-7 | Pt/C | 275 | 1445 | 13 | 10 | 5 | 29 | 19 | 23 | 3 |
| Ex. 8-8 | Ru/C | 125 | 1-step | 29 | 36 | 17 | 17 | 3 | 42 | 0 |

As seen in Table 5, the narrowest distribution of product based on carbon number for the higher numbered carbon is obtained with Pt/C catalyst at a temperature of 250° C., at 1445 psi (Ex. 8-6).

Table 6 shows product distribution by carbon number, for the above reaction.

TABLE 6

| | Cat. | Temp. (° C.) | Pressure (psi) | % C in Product (per product category) Light Gases ($C_{1-4}$) | Gasoline Fraction ($C_{5-6}$) | Chemical Fraction | Unidentified Fractions |
|---|---|---|---|---|---|---|---|
| Ex. 8-1 | Pt/C | 220 | 750 | 8.8 | 15.0 | 41.1 | 35.1 |
| Ex. 8-2 | Ru/C | 220 | 750 | 13.6 | 11.0 | 30.2 | 45.2 |
| Ex. 8-3 | Pt/C | 250 | 750 | 17.4 | 22.3 | 24.5 | 35.8 |
| Ex. 8-4 | Ru/C | 250 | 750 | 61.1 | 19.8 | 8.3 | 10.9 |
| Ex. 8-5 | Pt/C | 220 | 1445 | 1.8 | 10.6 | 47.7 | 39.9 |
| Ex. 8-6 | Pt/C | 250 | 1445 | 3.3 | 15.5 | 39.9 | 41.3 |

As seen in Table 6, the greatest production of chemical fractions (i.e., alcohols, diols, polyols, furan derivatives, all having higher carbon numbers and functionality) is obtained with Pt/C catalyst at a temperature of 250° C., at 1445 psi (Ex. 8-6). The highest proportion of gasoline fraction (e.g., alkanes) is obtained with Pt/C catalyst at a temperature of 250° C., at 750 psi (Ex. 8-3). The highest proportion of light gases (e.g., lower alkanes) is obtained with Ru/C catalyst at a temperature of 250° C., at 750 psi (Ex. 8-4).

Table 7 shows product distribution of products by functional group, for the above reaction.

TABLE 7

| | Cat. | Temp. (° C.) | Pressure (psi) | % C in Product (by functional group) Alcohols | Alkanes | Furan derives. | Unreacted | Unknown |
|---|---|---|---|---|---|---|---|---|
| Ex. 8-1 | Pt/C | 220 | 750 | 45.1 | 12.4 | 4.5 | 3.2 | 34.8 |
| Ex. 8-2 | Ru/C | 220 | 750 | 30.6 | 15.1 | 4.8 | 4.3 | 45.2 |
| Ex. 8-3 | Pt/C | 250 | 750 | 37.0 | 21.2 | 4.5 | 1.6 | 35.8 |
| Ex. 8-4 | Ru/C | 250 | 750 | 19.4 | 65.2 | 3.2 | 1.1 | 11.0 |
| Ex. 8-5 | Pt/C | 220 | 1445 | 48.2 | 2.7 | 6.0 | 3.6 | 39.5 |
| Ex. 8-6 | Pt/C | 250 | 1445 | 44.3 | 6.6 | 5.4 | 2.8 | 40.9 |
| Ex. 8-8 | Ru/C | 125 | 1-step | 37.8 | 7.5 | 4.7 | 1.5 | 46.5 |

As seen in Table 7, the highest production of alkanes is obtained with Ru/C catalyst at a temperature of 250° C., at 750 psi (Ex. 8-4). The highest concentration of alcohols is obtained with Pt/C catalyst at a temperature of 220° C., at 1445 psi (Ex. 8-5).

Table 8 shows product distribution of products by functional group, for the above reaction.

TABLE 8

| | Cat. | Temp. (° C.) | Pressure (psi) | % C in Product (by functional group) Alcohol | Diol | Polyol | Alkane | Furan derivs | Acids | Unknown |
|---|---|---|---|---|---|---|---|---|---|---|
| Ex. 8-1 | Pt/C | 220 | 750 | 9.8 | 20.8 | 24.4 | 12.4 | 4.5 | 3.0 | 34.8 |
| Ex. 8-2 | Ru/C | 220 | 750 | 8.5 | 15.9 | 6.2 | 15.1 | 4.8 | 4.2 | 45.2 |
| Ex. 8-3 | Pt/C | 250 | 750 | 18.8 | 17.8 | 0.4 | 21.2 | 4.5 | 1.5 | 35.8 |
| Ex. 8-4 | Ru/C | 250 | 750 | 13.6 | 4.5 | 1.3 | 65.5 | 3.2 | 1.1 | 11.0 |
| Ex. 8-5 | Pt/C | 220 | 1445 | 7.4 | 24.0 | 16.8 | 2.7 | 6.0 | 3.3 | 39.5 |
| Ex. 8-6 | Pt/C | 250 | 1445 | 11.6 | 29.9 | 2.8 | 6.6 | 5.4 | 2.6 | 40.9 |
| Ex. 8-7 | Pt/C | 275 | 1445 | 16.0 | 17.1 | 0.7 | 7.7 | 5.0 | 1.4 | 52.0 |
| Ex. 8-8 | Ru/C | 125 | 1-step | 5.6 | 21.4 | 10.8 | 7.5 | 4.7 | 5.2 | 46.5 |

As seen in Table 8, the highest overall distribution of alcohol, diol, and polyol is obtained using Pt/C catalyst at a temperature of 250° C., at 1445 psi (Ex. 8-5). The highest concentration of alkanes is obtained with Ru/C catalyst at a temperature of 250° C., at 750 psi (Ex. 8-5).

Table 9 shows conversion to products for the feed using the Ru/C catalyst.

TABLE 9

| | Ru/C, 750 psi Example - 8-9 | Example 8-4 | Example 8-2 | Example 8-10 |
|---|---|---|---|---|
| First/second stage reaction temperatures | (125° C./ 200° C.) | (125° C./ 250° C.) | (125° C./ 220° C.) | (125° C./ 250° C.) |
| Flow (Mmol-C/l) | 0.08 | 0.08 | 0.08 | 0.16 |

TABLE 9-continued

| | Ru/C, 750 psi Example - 8-9 | Example 8-4 | Example 8-2 | Example 8-10 |
|---|---|---|---|---|
| Hydroxyacetaldehyde | 100 | 100 | 100 | 100 |
| Acetic acid | 7 | 75 | 7 | 2 |
| Hydroxyacetone | 100 | 100 | 100 | 100 |
| 2(5H)furanone | 100 | 100 | 100 | 100 |
| Phenol | 100 | 100 | 100 | 100 |

TABLE 9-continued

| | Ru/C, 750 psi Example - 8-9 | Example 8-4 | Example 8-2 | Example 8-10 |
|---|---|---|---|---|
| 3-methyl-l,2-cyclopentadione | 100 | 100 | 100 | 100 |
| Guaiacol | 100 | 100 | 100 | 100 |

TABLE 9-continued

| | Ru/C, 750 psi Example - 8-9 | Example 8-4 | Example 8-2 | Example 8-10 |
|---|---|---|---|---|
| Catechol | 100 | 100 | 100 | 100 |
| Furfural | 100 | 100 | 100 | 100 |
| 2-Cyclopenten-1-one | 100 | 100 | 100 | 100 |
| 3-Hydroxyemthylfurfural | 99 | 100 | 100 | 100 |
| Levoglucosan | 96 | 100 | 98 | 95 |
| Sugars | 91 | 98 | 91 | 91 |

As seen in Table 9, Ru/C provides high conversion for all listed species in the feed except for acetic acid and sugars. Of these, the highest overall conversion of all species including acetic acid and sugars is obtained with Ru/C catalyst at a temperature of 250° C., at 750 psi (Ex. 8-4).

Table 10 shows conversion distribution to products for the Pt/C catalyst.

TABLE 10

| Cat: Pt/C Flow: 0.08 ml/min | Example 8-1 | Example 8-3 | Example 8-5 | Example 8-6 | Example 8-7 |
|---|---|---|---|---|---|
| First/second stage reaction temperatures | (125° C./ 220° C.) | (125° C./ 250° C.) | (125° C./ 220° C.) | (125° C./ 250° C.) | (125° C./ 275° C.) |
| Pressure (psi) | 750 | 750 | 1450 | 1450 | 1450 |
| Hydroxy-acetaldehyde | 100 | 100 | 100 | 100 | 100 |
| Acetic acid | 17 | 59 | 8 | 28 | 61 |
| Hydroxyacetone | 100 | 100 | 100 | 100 | 100 |
| 2(5H)furanone | 100 | 100 | 100 | 100 | 100 |
| Phenol | 100 | 100 | 100 | 100 | 100 |
| 3-methyl-1,2-cyclopentadione | 100 | 100 | 100 | 100 | 100 |
| Guaiacol | 100 | 100 | 100 | 100 | 100 |
| Catechol | 100 | 100 | 100 | 100 | 100 |
| Furfural | 100 | 100 | 100 | 100 | 100 |
| 2-Cyclopenten-1-one | 100 | 100 | 100 | 100 | 100 |
| 3-Hydroxyemthyl-furfural | 99 | 100 | 100 | 100 | 100 |
| Levoglucosan | 96 | 100 | 98 | 95 | 100 |
| Sugars | 91 | 98 | 91 | 91 | 100 |

As seen in Table 10, the highest concentration of acetic acid converted is obtained with Pt/C catalyst at a temperature of 275° C., at 1450 psi (Ex. 8-7), which is slightly greater than the conversion obtained for Pt/C catalyst at a temperature of 250° C., at 750 psi (Ex. 8-5). Hence, in this instance, there is only slight improvement in conversion obtained for approximately double the reaction pressure.

Table 11 shows a detailed product distribution of products for the Pt/C catalyst.

TABLE 11

| | | Example 8-1 | Example 8-3 | Example 8-5 | Example 8-6 | Example 8-7 |
|---|---|---|---|---|---|---|
| Pressure (psi) | — | 750 | 750 | 1450 | 1450 | 1450 |
| Hydrogenation Temperature | — | (125° C./220° C.) | (125° C./250° C.) | (125° C./220° C.) | (125° C./250° C.) | (125° C./275° C.) |
| | Bp (° C.) | — | — | — | — | — |
| C1 | −161 | 6.9 | 14.6 | 1.5 | 2.6 | 2.8 |
| C2 | −88 | 0.9 | 1.4 | 0.2 | 0.2 | 0.7 |
| C3 | −42 | 0.7 | 0.9 | 0.1 | 0.4 | 0.5 |
| C4 | 0 | 0.3 | 0.4 | 0.1 | 0.1 | 0.2 |
| Total light gases | — | 8.8 | 17.4 | 1.8 | 3.3 | 4.2 |
| C5 | 36 | 0.4 | 0.5 | 0.1 | 0.4 | 0.4 |
| C6 | 69 | 3.2 | 3.3 | 0.8 | 2.9 | 3.0 |
| Methanol | 65 | 1.3 | 1.7 | 1.2 | 1.4 | 2.0 |
| Ethanol | 78 | 1.1 | 3.3 | 0.8 | 1.2 | 2.9 |
| 1-propanol | 97 | 0.9 | 2.0 | 0.5 | 1.1 | 1.5 |
| Tetrahydrofuran | 66 | 0.2 | 0.5 | 0.2 | 0.2 | 0.2 |
| Tetrahydro-2H-pyran-2-methanol | 95 | 0.6 | 1.0 | 0.5 | 0.8 | 0.8 |
| 2-butanol | 99 | 0.2 | 0.3 | 0.2 | 0.4 | 0.4 |
| Tatrahydro-2-methylfuran | 80 | 0.4 | 0.6 | 0.4 | 0.5 | 0.5 |
| 1,2-cycohexanediol | 117 | 2.3 | 1.8 | 2.9 | 2.7 | 1.6 |
| Tetrahydro-2,5-dimethylfuran | — | 0.5 | 0.6 | 0.4 | 0.5 | 0.4 |
| 1-butanol | 118 | 0.4 | 0.8 | 0.2 | 0.3 | 0.5 |
| 2-pentanol | 119 | 0.2 | 0.3 | 0.1 | 0.1 | 0.1 |
| 1-pentanol | 138 | 0.1 | 0.7 | 0.1 | 0.2 | 0.4 |
| Cyclopentanol | 140 | 0.6 | 1.2 | 0.5 | 0.6 | 0.7 |
| 2-hexanol | 140 | 0.1 | 0.6 | 0.1 | 0.2 | 0.3 |
| 3-methylcyclopentanol | 160 | 0.6 | 1.1 | 0.5 | 0.8 | 0.9 |
| Cyclohexanol | 161 | 01.9 | 1.9 | 1.3 | 1.3 | 1.0 |
| Total Gasoline-range compounds | — | 15.0 | 22.3 | 10.6 | 15.5 | 17.8 |

TABLE 11-continued

| | | Example 8-1 | Example 8-3 | Example 8-5 | Example 8-6 | Example 8-7 |
|---|---|---|---|---|---|---|
| Acetic acid | 118 | 3.0 | 1.5 | 3.3 | 2.6 | 1.4 |
| 3-methylcyclohexanol | 170 | 0.5 | 0.9 | 0.6 | 0.9 | 0.8 |
| 4-methylcyclohexanol | 170 | 0.4 | 0.6 | 0.4 | 0.5 | 0.4 |
| 2,3-butanediol | 177 | 0.9 | 1.1 | 0.7 | 0.9 | 0.8 |
| Tetrahydrofurfuryl alcohol | 178 | 1.0 | 2.4 | 0.5 | 0.1.8 | 3.3 |
| 1,2,6-hexanetriol | 178 | 0.3 | 0.0 | 0.4 | 0.4 | 0.0 |
| Sugars | 186 | 0.2 | 0.1 | 0.3 | 0.2 | 0.1 |
| Propylene glycol | 188 | 5.0 | 5.5 | 5.3 | 7.9 | 5.4 |
| 1,2,3-butanetriol | 190 | 0.3 | 0.4 | 0.6 | 0.7 | 0.7 |
| 1,2-butanediol | 193 | 1.8 | 2.5 | 2.1 | 3.4 | 2.8 |
| Ethylene glycol | 197 | 8.9 | 4.8 | 10.4 | 11.6 | 4.7 |
| Gamma-butyrolactone | 204 | 2.0 | 2.3 | 3.0 | 2.8 | 2.8 |
| Gamma-valerolactone | 208 | 0.3 | 0.4 | 0.3 | 0.3 | 0.3 |
| 1,2-hexanediol | 223 | 0.2 | 0.4 | 0.5 | 0.7 | 0.5 |
| 1,4-butanediol | 230 | 1.0 | 0.9 | 1.5 | 1.7 | 0.8 |
| 1,4-pentanediol | 242 | 0.5 | 0.8 | 0.4 | 0.6 | 0.5 |
| Gamma-hydroxymethyl-gamma-butyrolactone | — | 1.1 | 0.0 | 1.9 | 1.2 | 0.6 |
| Glycerol | 290 | 1.1 | 0.0 | 1.0 | 1.2 | 0.0 |
| Sorbitol | 296 | 12.7 | 0.0 | 14.8 | 0.5 | 0.0 |
| Total chemicals | — | 41.1 | 24.5 | 47.4 | 39.9 | 26.0 |
| Total products | — | 64.9 | 64.2 | 60.1 | 58.7 | 48.0 |
| Unidentified carbon | — | 35.1 | 35.8 | 39.9 | 41.3 | 52.0 |
| % Carbon in gas phase | — | 19.5 | 28.1 | 9.7 | 15.0 | 35.8 |
| pH | 2.1 | 3.7 | 3.8 | 3.7 | 3.8 | — |

Finally, as seen in Table 11, the highest production of chemical fraction is obtained for Pt/C catalyst at a temperature of 250° C., at 750 psi (Ex. 8-5).

It can thus be seen that adjustment in the catalyst by selection of metallic catalyst (Pt versus Ru), as well as temperature and pressure, can be adjusted to obtain different distributions of products for a second hydrogenation to provide polyol and other chemicals.

EXAMPLE 9

Production of Large Alkanes from Lignin Fraction (Water Insoluble Bio-Oil Fraction) by Hydrotreating Using Platinum on Zirconium Phosphate Catalyst A lignin fraction (i.e., water insoluble bio-oil), prepared according to the fractionation method of Example 1, was subject to catalytic hydrogenation using a platinum on zirconium phosphate catalyst as described below.

Catalyst preparation. A zirconium phosphate based catalyst was prepared by a co-precipitation method. A solution of zirconium hydroxide ($Zr(OH)_4$) as a zirconium precursor was dissolved in deionized water. To this solution, a stoichiometric amount of phosphoric acid as a phosphorus precursor was added. The resulting mixture was heated at 80° C. for 2 hours to remove water, and a paste was obtained. The resulting paste was then dried in an oven at 100° C. overnight (about 12-18 hours) to remove the bulk of any remaining water, and to provide a powder. The powder was then calcined at 350° C. for 2 hours to obtain powdered zirconium phosphate.

The zirconium phosphate so obtained was subsequently used as a support for the Pt supported catalyst for lignin hydrotreating reaction. To prepare the supported catalyst, a precursor solution of tetra-amine platinum(I) nitrate ($Pt(NH_3)_4(NO_3)_2$) was prepared in water. The quantity of water was selected to provide a desirable incipient pore volume for the zirconium phosphate support, where an excessive amount of water may cause active Pt to form as a separate entity without forming a bond with the support zirconium phosphate. Hence, it is desirable to control the amount of water as a factor in determining the final structure of platinum and consequently the activity of the synthesized catalyst. The precursor solution was added drop-wise to a suspension of the zirconium phosphatein water with constant stirring for uniform distribution on the support, where he quantity of platinum precursor corresponded to 4% w/w Pt on zirconium phosphate. Double impregnation (of Pt into the porous structure of the zirconium phosphate) was then performed by drying overnight to remove water from the resulting partially impregnated sample, in an oven at 100° C. After the completion of the impregnation, the wet sample was dried overnight at room temperature and at 100° C. for 6 hours to remove remaining water from zirconium phosphate support. The dried supported catalyst precursor was then calcined at 350° C. for 2 hours to obtain the 4% Pt/zirconium phosphate catalyst.

Feed preparation. The lignin fraction, also referred to as the water insoluble bio-oil (WIBO), was diluted with methanol to provide a 10% w/w WIBO in methanol solution. The viscosity of the resulting solution is significantly lower than that of bio-oil. The WIBO-methanol solution was then filtered to remove char particles present in the WIBO, in order to reduce the possibility of char particles clogging the feed pump during the hydrotreatment. Subsequently, the solution was subjected to hydro-treating in a fixed-bed down-flow reactor.

Reactor set-up. An Eldex HPLC pump was used to pump the WIBO-methanol solution to the reactor at high pressure (900 psi; 6.21 MPa). A flow rate of about 0.03 ml/min was maintained during the reaction. The flow rate of 40 ml/min. of high purity $H_2$ (High purity Grade, available from Air Gas) was used for the hydrotreating and was controlled for flow using a mass flow controller (available from Brooks Instruments). The hydrogen gas was sufficient to pressurize the reactor to the desired pressure and also for hydrogenating the lignin-methanol solution. The down-flow reactor was maintained at a temperature of 300° C. throughout the reaction.

Reactions Conditions and Results. The product was obtained after hydrogenation at a temperature of 300° C. and pressure of 900 psi as a two-phase product. Components of both phases (upper and lower) were analyzed by GC-MS using the method as described above. The yield and distribution of products is shown in the following Table 12.

TABLE 12

| Component | Yield in % C | |
|---|---|---|
| | Top layer | Bottom layer |
| Cycloalkanes | 0 | 5.6 |
| Acids and Esters | 0.1 | 1.8 |
| Alkanes | 0 | 22.8 |
| Phenols | 1.2 | 8.9 |

Following are the components identified in each of the groups: cycloalkanes obtained included cyclopentane, cyclohexane, methyl-, ethyl- and propyl-cyclohexane; acids and esters obtained included ethyl butanoate, pentanoic acid, heptanoic acid, octanoic acid, and nonanoic acid; alkanes obtained included n-hexadeacane, n-heptadecane, n-octadecane, n-$C_{22}$ alkane, and minor amounts of higher alkanes (>$C_{22}$); phenols obtained included methyl-, dimethyl- and ethyl-phenols, and methoxy- and ethoxy-phenols.

From table 12, it can be seen that by this method, a significant percentage of the bottom layer includes higher alkane products. Depending on the distribution of precursors in the feed, it may be desirable to effect hydrotreating in lieu of, or in addition to, hydrocracking to control the resulting distribution of products, where alkanes and phenols predominate. It should be noted that the top layer product distribution is poor in such components likely due to immiscibility of these products in the top layer (methanol).

The singular forms "a," "an," and "the" include plural referents unless the context clearly dictates otherwise. Unless defined otherwise, technical and scientific terms used herein have the same meaning as is commonly understood by one of skill in the art to which this invention belongs. The endpoints of all ranges directed to the same component or property are inclusive and independently combinable. The suffix "(s)" as used herein is intended to include both the singular and the plural of the term that it modifies, thereby including at least one of that term. "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of generating hydrogen from a bio-oil, comprising:

hydrogenating a water-soluble fraction of the bio-oil with hydrogen in the presence of a hydrogenation catalyst, reforming the water-soluble fraction by aqueous-phase reforming in the presence of a reforming catalyst, wherein hydrogen is generated by the reforming, and the amount of hydrogen generated is greater than that consumed by the hydrogenating, and hydrocracking a lignin fraction of the bio-oil with hydrogen in the presence of a hydrocracking catalyst, wherein the lignin fraction of bio-oil is obtained as a water-insoluble fraction from aqueous extraction of bio-oil, and wherein a solvent is added to the lignin fraction.

2. The method of claim 1, wherein the solvent is an alcohol.

3. A method of generating hydrogen from a bio-oil, comprising:

hydrogenating a water-soluble fraction of the bio-oil with hydrogen in the presence of a hydrogenation catalyst, reforming the water-soluble fraction by aqueous-phase reforming in the presence of a reforming catalyst, wherein hydrogen is generated by the reforming, and the amount of hydrogen generated is greater than that consumed by the hydrogenating, and hydrocracking a lignin fraction of the bio-oil with hydrogen in the presence of a hydrocracking catalyst, wherein the hydrocracking catalyst is $Pt/SiO_2$-$Al_2O_3$, and wherein the lignin fraction of bio-oil is obtained as a water-insoluble fraction from aqueous extraction of bio-oil.

4. A method of generating hydrogen from a bio-oil, comprising:

hydrogenating a water-soluble fraction of the bio-oil with hydrogen in the presence of a hydrogenation catalyst, reforming the water-soluble fraction by aqueous-phase reforming in the presence of a reforming catalyst, wherein hydrogen is generated by the reforming, and the amount of hydrogen generated is greater than that consumed by the hydrogenating, and hydrotreating a lignin fraction of the bio-oil with hydrogen in the presence of a hydrotreating catalyst, wherein the lignin fraction of bio-oil is obtained as a water-insoluble fraction from aqueous extraction of bio-oil, wherein a solvent is added to the lignin fraction.

5. The method of claim 4, wherein the solvent is an alcohol.

6. A method of generating hydrogen from a bio-oil, comprising:

hydrogenating a water-soluble fraction of the bio-oil with hydrogen in the presence of a hydrogenation catalyst, reforming the water-soluble fraction by aqueous-phase reforming in the presence of a reforming catalyst, wherein hydrogen is generated by the reforming, and the amount of hydrogen generated is greater than that consumed by the hydrogenating, and hydrotreating a lignin fraction of the bio-oil with hydrogen in the presence of a hydrotreating catalyst, wherein the lignin fraction of bio-oil is obtained as a water-insoluble fraction from aqueous extraction of bio-oil, and wherein the hydrotreating catalyst is $Pt/ZrPO_4$.

7. A method of generating hydrogen from a bio-oil, comprising:

hydrogenating a water-soluble fraction of the bio-oil with hydrogen in the presence of a hydrogenation catalyst, reforming the water-soluble fraction by aqueous-phase reforming in the presence of a reforming catalyst, and hydrotreating a lignin fraction of the bio-oil with hydrogen in the presence of a hydrotreating catalyst, wherein hydrogen is generated by the reforming, and the amount of hydrogen generated is greater than that consumed by the hydrogenating;

wherein the lignin fraction of bio-oil is obtained as a water-insoluble fraction from aqueous extraction of bio-oil; and wherein the hydrotreating catalyst is a Group VII or Group VIII metal supported on niobium phosphate or zirconium phosphate.

* * * * *